(12) United States Patent
Zhang et al.

(10) Patent No.: US 10,778,511 B2
(45) Date of Patent: Sep. 15, 2020

(54) AIR INTERFACE TECHNOLOGY CONFIGURATION METHOD, APPARATUS, AND WIRELESS COMMUNICATIONS SYSTEM

(71) Applicant: Huawei Technologies Co., Ltd., Shenzhen (CN)

(72) Inventors: Jian Zhang, Shenzhen (CN); Yada Huang, Shanghai (CN); Qinghai Zeng, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 75 days.

(21) Appl. No.: 16/119,525

(22) Filed: Aug. 31, 2018

(65) Prior Publication Data
US 2018/0367382 A1    Dec. 20, 2018

Related U.S. Application Data

(63) Continuation of application No. PCT/CN2017/075363, filed on Mar. 1, 2017.

(30) Foreign Application Priority Data

Mar. 4, 2016   (CN) .......................... 2016 1 0127903

(51) Int. Cl.
*H04L 12/24*   (2006.01)
*H04W 72/00*   (2009.01)
(Continued)

(52) U.S. Cl.
CPC ......... *H04L 41/0806* (2013.01); *H04W 24/10* (2013.01); *H04W 72/00* (2013.01);
(Continued)

(58) Field of Classification Search
CPC ... H04L 41/0806; H04L 41/04; H04L 41/085; H04L 41/12; H04L 45/02; H04W 24/10;
(Continued)

(56) References Cited

U.S. PATENT DOCUMENTS

| | | | |
|---|---|---|---|
| 9,236,938 B2* | 1/2016 | Parkvall | H04B 7/2656 |
| 2007/0091896 A1* | 4/2007 | Liu | H04J 3/1617 |
| | | | 370/395.5 |

(Continued)

FOREIGN PATENT DOCUMENTS

| | | |
|---|---|---|
| CN | 101282567 A | 10/2008 |
| CN | 101282568 A | 10/2008 |

(Continued)

OTHER PUBLICATIONS

"Control signaling enhancements for short TTI," 3GPP TSG-RAN WG1#83, Anahelm, USA, R1-156461, 3rd Generation Partnership Project, Valbonne, France (Nov. 15-22, 2015).

(Continued)

*Primary Examiner* — Robert J Lopata
(74) *Attorney, Agent, or Firm* — Leydig, Voit & Mayer, Ltd.

(57) ABSTRACT

A method for supporting a wireless access device in configuring a plurality of air interface (AI) technologies on a same carrier for a user equipment (UE), thereby improving utilization and use flexibility of resources on a same carrier, includes: determining, by a wireless access device, at least two AI technologies that need to be configured on a same carrier; determining, by the wireless access device, configuration information of the at least two AI technologies; and sending, by the wireless access device, the configuration information of the at least two AI technologies to the UE, where the configuration information of the at least two AI (Continued)

technologies is used by the UE to configure the at least two AI technologies on the same carrier.

28 Claims, 9 Drawing Sheets

(51) Int. Cl.
*H04W 24/10* (2009.01)
*H04W 72/04* (2009.01)
*H04W 72/08* (2009.01)
*H04W 92/10* (2009.01)

(52) U.S. Cl.
CPC ....... *H04W 72/042* (2013.01); *H04W 72/044* (2013.01); *H04W 72/085* (2013.01); *H04W 92/10* (2013.01)

(58) Field of Classification Search
CPC . H04W 72/00; H04W 72/042; H04W 72/044; H04W 72/085; H04W 92/10; H04W 84/18
USPC ........................................................ 370/254
See application file for complete search history.

(56) References Cited

U.S. PATENT DOCUMENTS

| 2009/0245171 | A1 | 10/2009 | Suzuki et al. | |
|---|---|---|---|---|
| 2010/0118810 | A1 | 5/2010 | Qu et al. | |
| 2010/0135207 | A1 | 6/2010 | Qu et al. | |
| 2011/0044218 | A1 | 2/2011 | Kaur et al. | |
| 2013/0016696 | A1* | 1/2013 | Adjakple | H04W 36/22 370/331 |
| 2014/0044105 | A1* | 2/2014 | Bontu | H04L 5/001 370/336 |
| 2014/0066083 | A1 | 3/2014 | Hui et al. | |
| 2016/0073312 | A1* | 3/2016 | Sridhar | H04W 48/16 370/235 |
| 2016/0183174 | A1* | 6/2016 | Xie | H04W 48/18 455/436 |
| 2016/0278106 | A1* | 9/2016 | Jarrahi Khameneh | H04L 5/0023 |
| 2017/0164403 | A1* | 6/2017 | Lindheimer | H04W 74/08 |
| 2017/0367003 | A1* | 12/2017 | Zhang | H04W 84/045 |
| 2018/0220425 | A1 | 8/2018 | Zhang et al. | |

FOREIGN PATENT DOCUMENTS

| CN | 102257735 A | 11/2011 |
|---|---|---|
| CN | 106559872 A | 4/2017 |
| JP | 2014143696 A | 8/2014 |
| WO | 2007125570 A1 | 11/2007 |
| WO | 2010077318 A1 | 7/2010 |

OTHER PUBLICATIONS

"Report of 3GPP RAN workshop on "5G"," 3GPP RAN workshop on 5G, RWS-150076, Phoenix, USA, XP0510389283, pp. 1-40, 3rd Generation Partnership Project—Valbonne, France (Sep. 17-18, 2015).

"Vision on 5G Radio Access Technologies," 3GPP RAN workshop on 5G, RWS-150006, Huawei Technologies, Phoenix, USA, XP051043758, pp. 1-18, 3rd Generation Partnership Project—Valbonne, France (Sep. 17-18, 2015).

* cited by examiner

AIR INTERFACE TECHNOLOGY CONFIGURATION METHOD, APPARATUS, AND WIRELESS COMMUNICATIONS SYSTEM

CROSS-REFERENCE TO RELATED APPLICATIONS

This application is a continuation of International Application No. PCT/CN2017/075363, filed on Mar. 1, 2017, which claims priority to Chinese Patent Application No. 201610127903.5, filed on Mar. 4, 2016. The disclosures of the aforementioned applications are hereby incorporated by reference in their entireties.

TECHNICAL FIELD

Embodiments of the present disclosure relate to the communications field, and in particular, to an air interface technology configuration method, an apparatus, and a wireless communications system.

BACKGROUND

With continuous development of communication technologies, wireless communications systems support more diverse service requirements and scenarios. Sometimes, services having quite different quality of service (QoS) requirements also have different requirements on an air interface (AI) technology. For example, a mobile broadband (MBB) service and an ultra-reliable and low latency communications (URLLC) service have different requirements on an AI technology. Therefore, to support more diverse service requirements, a wireless communications system needs to support an increasing quantity of AI technologies.

In a current wireless communications system, when a base station configures an AI technology for a user equipment (UE), the base station can configure only one AI technology on one carrier. That is, the base station may configure different AI technologies only on different carriers for the UE, so that the UE can use a plurality of AI technologies simultaneously.

However, in the current wireless communications system, because the base station may configure only one AI technology on one carrier for the UE, resource utilization on the carrier is relatively low. In addition, when an operator supports only one carrier, the operator cannot satisfy diverse service requirements because the operator cannot support a plurality of AI technologies, leading to a reduction in use flexibility of resources on the carrier.

SUMMARY

Embodiments of the present disclosure provide an air interface technology configuration method, an apparatus, and a wireless communications system, to provide a method for supporting a wireless access device in configuring a plurality of AI technologies on a same carrier for UE, thereby improving utilization and use flexibility of resources on a same carrier.

To achieve the foregoing objective, the following technical solutions are used in the embodiments of the present disclosure.

According to a first aspect, an embodiment of the present disclosure provides an AI technology configuration method, including:

determining, by a wireless access device, at least two AI technologies that need to be configured on a same carrier; determining, by the wireless access device, configuration information of the at least two AI technologies; and sending, by the wireless access device, the configuration information of the at least two AI technologies to a UE, where the configuration information of the at least two AI technologies is used by the UE to configure the at least two AI technologies on the same carrier.

In the AI technology configuration method provided in this embodiment of the present disclosure, the wireless access device may determine the at least two AI technologies that need to be configured on the same carrier and the configuration information of the at least two AI technologies, and the wireless access device may send the configuration information of the at least two AI technologies to the UE, so that the UE configures the at least two AI technologies on the same carrier. Therefore, by using the AI technology configuration method provided in this embodiment of the present disclosure, the wireless access device can be supported in configuring a plurality of AI technologies on a same carrier for the UE, so as to use the plurality of AI technologies more flexibly, and to be better adapted to application scenarios in which the plurality of AI technologies need to be used in a wireless communications system, thereby improving utilization and use flexibility of resources on the same carrier.

Optionally, in this embodiment of the present disclosure, after the sending, by the wireless access device, the configuration information of the at least two AI technologies to the UE, the configuration method provided in this embodiment of the present disclosure further includes:

allocating, by the wireless access device to the UE, resources corresponding to the at least two AI technologies on the same carrier; determining, by the wireless access device, a resource location of resource allocation information based on a preset subcarrier spacing and a transmission time interval TTI length corresponding to each of the at least two AI technologies; and sending, by the wireless access device, the resource allocation information to the UE based on the resource location, where the resource allocation information is used to indicate a resource corresponding to the AI technology.

Optionally, in this embodiment of the present disclosure, after the sending, by the wireless access device, the configuration information of the at least two AI technologies to the UE, the configuration method provided in this embodiment of the present disclosure further includes:

allocating, by the wireless access device to the UE, resources corresponding to the at least two AI technologies on the same carrier; determining, by the wireless access device, a resource location of resource allocation information based on a subcarrier spacing for each of the at least two AI technologies and a TTI length for the AI technology; and sending, by the wireless access device, the resource allocation information to the UE based on the resource location, where the resource allocation information is used to indicate a resource corresponding to the AI technology.

Optionally, in this embodiment of the present disclosure, after the sending, by the wireless access device, the configuration information of the at least two AI technologies to the UE, the configuration method provided in this embodiment of the present disclosure further includes:

allocating, by the wireless access device to the UE, resources corresponding to the at least two AI technologies on the same carrier; determining, by the wireless access device in a first frequency subrange corresponding to each of the at least two AI technologies, a resource location of resource allocation information based on a subcarrier spacing for the AI technology and a TTI length for the AI technology; and sending, by the wireless access device, the resource allocation information to the UE based on the resource location, where the resource allocation information is used to indicate a resource corresponding to the AI technology.

In this embodiment of the present disclosure, the wireless access device may determine the resource location of the resource allocation information based on a pre-agreed method in the foregoing three methods. Therefore, when the wireless access device sends the resource allocation information to the UE at the resource location, it can be ensured that the UE can receive the resource allocation information at the resource location.

Optionally, the configuration method provided in this embodiment of the present disclosure further includes:

sending, by the wireless access device to the UE, measurement information corresponding to the at least two AI technologies, where the measurement information is used to instruct the UE to perform measurement.

In the AI technology configuration method provided in this embodiment of the present disclosure, because measurement performed by the UE can be supported in a case of a plurality of AI technologies, the UE mobility management and more efficient resource allocation can be implemented in the case of the plurality of AI technologies.

Optionally, the configuration method provided in this embodiment of the present disclosure further includes:

in a first TTI, activating, by the wireless access device in the first frequency range, measurement information corresponding to a first AI technology in the at least two AI technologies, and deactivating, by the wireless access device in a second frequency range, the measurement information corresponding to the first AI technology.

In the AI technology configuration method provided in this embodiment of the present disclosure, because the measurement information corresponding to the AI technologies can be activated and deactivated, it can be ensured that the measurement performed by the UE can be flexibly adapted to changes in a frequency range and a TTI that correspond to each AI technology.

Optionally, the configuration method provided in this embodiment of the present disclosure further includes:

configuring, by the wireless access device, a same physical uplink control channel PUCCH for each of the at least two AI technologies; or configuring, by the wireless access device, a different PUCCH for each of the at least two AI technologies; or configuring, by the wireless access device, different PUCCHs for some of the at least two AI technologies, and configuring, by the wireless access device for other AI technologies than the some of the at least two AI technologies, a PUCCH the same as that for at least one of the some AI technologies.

In this embodiment of the present disclosure, when the wireless access device configures PUCCHs for the UE, a corresponding configuration method in the foregoing three configuration methods may be selected based on different application scenarios, thereby adaptively reducing a quantity of PUCCHs, reducing a power peak of an uplink signal, and avoiding different units of measurement used for different AI technologies.

Further, in the method in which the wireless access device configures PUCCHs for the plurality of AI technologies provided in this embodiment, hybrid automatic repeat request HARQ feedback, a scheduling request, channel state information CSI feedback, power control, and the like can be supported in the case of the plurality of AI technologies. Therefore, resources can be allocated more flexibly, thereby improving resource utilization.

Optionally, the configuration method provided in this embodiment of the present disclosure further includes:

configuring, by the wireless access device, different physical downlink control channels PDCCHs/enhanced physical downlink control channels EPDCCHs for some of the at least two AI technologies, and configuring, by the wireless access device for other AI technologies than the some of the at least two AI technologies, a PDCCH/an EPDCCH the same as that for at least one of the some AI technologies, where the other AI technologies and the at least one AI technology correspond to different carriers.

In the method in which the wireless access device configures PDCCHs/EPDCCHs for the plurality of AI technologies provided in this embodiment, a same PDCCH/EPDCCH may be configured for different AIs on a same carrier or on different carriers. Therefore, resources can be allocated more flexibly, thereby improving resource utilization.

According to a second aspect, an embodiment of the present disclosure provides an AI technology configuration method, including:

receiving, by the UE, configuration information that is of at least two AI technologies on a same carrier and that is sent by a wireless access device; and configuring, by the UE, the at least two AI technologies on the same carrier based on the configuration information of the at least two AI technologies.

In the AI technology configuration method provided in this embodiment of the present disclosure, the UE may receive the configuration information, sent by the wireless access device, of the at least two AI technologies that need to be configured on the same carrier, and the UE may configure the at least two AI technologies on the same carrier based on the configuration information of the at least two AI technologies. Therefore, the UE provided in this embodiment of the present disclosure can be supported in configuring a plurality of AI technologies on a same carrier, so as to use the plurality of AI technologies more flexibly, and to be better adapted to application scenarios in which the plurality of AI technologies need to be used in a wireless communications system, thereby improving utilization and use flexibility of resources on the same carrier.

Optionally, in this embodiment of the present disclosure, after the configuring, by the UE, the at least two AI technologies on the same carrier based on the configuration information of the at least two AI technologies, the configuration method provided in this embodiment of the present disclosure further includes:

determining, by the UE, a resource location of resource allocation information based on a preset subcarrier spacing and a TTI length corresponding to each of the at least two AI technologies; and receiving, by the UE based on the resource location, the resource allocation information sent by the wireless access device, where the resource allocation information is used to indicate a resource corresponding to the AI technology.

Optionally, in this embodiment of the present disclosure, after the configuring, by the UE, the at least two AI technologies on the same carrier based on the configuration information of the at least two AI technologies, the configuration method provided in this embodiment of the present disclosure further includes:

determining, by the UE, a resource location of resource allocation information based on a subcarrier spacing for each AI technology and a TTI length for the AI technology; and receiving, by the UE based on the resource location, the resource allocation information sent by the wireless access device, where the resource allocation information is used to indicate a resource corresponding to the AI technology.

Optionally, in this embodiment of the present disclosure, after the configuring, by the UE, the at least two AI technologies on the same carrier based on the configuration information of the at least two AI technologies, the configuration method provided in this embodiment of the present disclosure further includes:

determining, by the UE in a first particular frequency range corresponding to each of the at least two AI technologies, a resource location of resource allocation information based on a subcarrier spacing for the AI technology and a TTI length for the AI technology; and receiving, by the UE based on the resource location, the resource allocation information sent by the wireless access device, where the resource allocation information is used to indicate a resource corresponding to the AI technology.

In this embodiment of the present disclosure, the wireless access device may determine the resource location of the resource allocation information based on a pre-agreed method in the foregoing three methods. Therefore, when the wireless access device sends the resource allocation information to the UE at the resource location, it can be ensured that the UE can receive the resource allocation information at the resource location. Further, the UE can learn of, based on the resource allocation information, a resource allocated by the wireless access device to the UE, and can transmit a service on the resource.

According to a third aspect, an embodiment of the present disclosure provides a wireless access device, including:

a determining unit, configured to determine at least two AI technologies that need to be configured on a same carrier and configuration information of the at least two AI technologies; and a sending unit, configured to send the configuration information that is of the at least two AI technologies and that is determined by the determining unit to the UE, where the configuration information of the at least two AI technologies is used by the UE to configure the at least two AI technologies on the same carrier.

In this embodiment of the present disclosure, the wireless access device may determine the at least two AI technologies that need to be configured on the same carrier and the configuration information of the at least two AI technologies, and the wireless access device may send the configuration information of the at least two AI technologies to the UE, so that the UE configures the at least two AI technologies on the same carrier. Therefore, the wireless access device provided in this embodiment of the present disclosure can be supported in configuring a plurality of AI technologies on a same carrier for the UE, so as to use the plurality of AI technologies more flexibly, and to be better adapted to application scenarios in which the plurality of AI technologies need to be used in a wireless communications system, thereby improving utilization and use flexibility of resources on the same carrier.

Optionally, in this embodiment of the present disclosure, the wireless access device further includes an allocation unit; and the allocation unit is configured to allocate, to the UE after the sending unit sends the configuration information of the at least two AI technologies to the UE, resources corresponding to the at least two AI technologies on the same carrier; the determining unit is further configured to determine a resource location of resource allocation information based on a preset subcarrier spacing and a TTI length corresponding to each of the at least two AI technologies, where the resource allocation information is used to indicate a resource that corresponds to the AI technology and that is allocated by the allocation unit; and the sending unit is further configured to send the resource allocation information to the UE based on the resource location determined by the determining unit.

Optionally, in this embodiment of the present disclosure, the wireless access device further includes an allocation unit; and the allocation unit is configured to allocate, to the UE after the sending unit sends the configuration information of the at least two AI technologies to the UE, resources corresponding to the at least two AI technologies on the same carrier; the determining unit is further configured to determine a resource location of resource allocation information based on a subcarrier spacing for each of the at least two AI technologies and a TTI length for the AI technology, where the resource allocation information is used to indicate a resource that corresponds to the AI technology and that is allocated by the allocation unit; and the sending unit is further configured to send the resource allocation information to the UE based on the resource location determined by the determining unit.

Optionally, in this embodiment of the present disclosure, the wireless access device further includes an allocation unit; and the allocation unit is configured to allocate, to the UE after the sending unit sends the configuration information of the at least two AI technologies to the UE, resources corresponding to the at least two AI technologies on the same carrier; the determining unit is further configured to determine, in a first frequency subrange corresponding to each of the at least two AI technologies, a resource location of resource allocation information based on a subcarrier spacing for the AI technology and a TTI length for the AI technology, where the resource allocation information is used to indicate a resource that corresponds to the AI technology and that is allocated by the allocation unit; and the sending unit is further configured to send the resource allocation information to the UE based on the resource location determined by the determining unit.

Optionally, in this embodiment of the present disclosure, the sending unit is further configured to send, to the UE, measurement information corresponding to the at least two AI technologies, where the measurement information is used to instruct the UE to perform measurement.

Optionally, in this embodiment of the present disclosure, the wireless access device further includes an activation unit; and the activation unit is configured to: in a first TTI, activate, in the first frequency range, measurement information corresponding to a first AI technology in the at least two AI technologies determined by the determining unit, and deactivate, in a second frequency range, the measurement information corresponding to the first AI technology.

Optionally, in this embodiment of the present disclosure, the wireless access device further includes a configuration unit; and the configuration unit is configured to: configure a same PUCCH for each of the at least two AI technologies determined by the determining unit; or configure a different PUCCH for each of the at least two AI technologies determined by the determining unit; or configure different PUCCHs for some of the at least two AI technologies determined by the determining unit, and configure, for other AI technologies than the some of the at least two AI technologies, a PUCCH the same as that for at least one of the some AI technologies.

Optionally, in this embodiment of the present disclosure, the wireless access device further includes a configuration unit; and the configuration unit is configured to: configure different PDCCHs/EPDCCHs for some of the at least two AI technologies determined by the determining unit, and configure, for other AI technologies than the some of the at least two AI technologies, a PDCCH/an EPDCCH the same as that for at least one of the some AI technologies, where the other AI technologies and the at least one AI technology correspond to different carriers.

For technical effects of the optional implementations of the third aspect, refer to related descriptions of technical effects of corresponding optional implementations of the first aspect, and details are not described herein again.

According to a fourth aspect, an embodiment of the present disclosure provides a UE, including:

a receiving unit, configured to receive configuration information that is of at least two AI technologies on a same carrier and that is sent by a wireless access device; and a configuration unit, configured to configure the at least two AI technologies on the same carrier based on the configuration information that is of the at least two AI technologies and that is received by the receiving unit.

In this embodiment of the present disclosure, the UE may receive the configuration information, sent by the wireless access device, of the at least two AI technologies that need to be configured on the same carrier, and the UE may configure the at least two AI technologies on the same carrier based on the configuration information of the at least two AI technologies. Therefore, the UE provided in this embodiment of the present disclosure can be supported in configuring a plurality of AI technologies on a same carrier, so as to use the plurality of AI technologies more flexibly, and to be better adapted to application scenarios in which the plurality of AI technologies need to be used in a wireless communications system, thereby improving utilization and use flexibility of resources on the same carrier.

Optionally, in this embodiment of the present disclosure, the UE further includes a determining unit; and the determining unit is configured to: after the configuration unit configures the at least two AI technologies on the same carrier based on the configuration information of the at least two AI technologies, determine a resource location of resource allocation information based on a preset subcarrier spacing and a TTI length corresponding to each of the at least two AI technologies, where the resource allocation information is used to indicate a resource corresponding to the AI technology; and the receiving unit is further configured to receive, based on the resource location determined by the determining unit, the resource allocation information sent by the wireless access device.

Optionally, in this embodiment of the present disclosure, the UE further includes a determining unit; and the determining unit is configured to: after the configuration unit configures the at least two AI technologies on the same carrier based on the configuration information of the at least two AI technologies, determine a resource location of resource allocation information based on a subcarrier spacing for each AI technology and a TTI length for the AI technology, where the resource allocation information is used to indicate a resource corresponding to the AI technology; and the receiving unit is further configured to receive, based on the resource location determined by the determining unit, the resource allocation information sent by the wireless access device.

Optionally, in this embodiment of the present disclosure, the UE further includes a determining unit; and the determining unit is configured to: after the configuration unit configures the at least two AI technologies on the same carrier based on the configuration information of the at least two AI technologies, determine, in a first particular frequency range corresponding to each of the at least two AI technologies, a resource location of resource allocation information based on a subcarrier spacing for the AI technology and a TTI length for the AI technology, where the resource allocation information is used to indicate a resource corresponding to the AI technology; and the receiving unit is further configured to receive, based on the resource location determined by the determining unit, the resource allocation information sent by the wireless access device.

For technical effects of the optional implementations of the fourth aspect, refer to related descriptions of technical effects of corresponding optional implementations of the second aspect, and details are not described herein again.

Optionally, in the first to the fourth aspects, a possible implementation is:

the configuration information of the at least two AI technologies includes a first particular frequency range and a common frequency range, the first particular frequency range includes a first frequency subrange that corresponds to the at least two AI technologies and that is pre-configured by the wireless access device, the first frequency subrange is used to transmit control information corresponding to the at least two AI technologies, and the common frequency range is used by the wireless access device to allocate, based on a resource requirement of the UE, resources corresponding to the at least two AI technologies.

Further, in the first to the fourth aspects, based on the foregoing possible implementation, another possible implementation is:

the configuration information of the at least two AI technologies further includes a second particular frequency range, the second particular frequency range includes a second frequency subrange that corresponds to each of the at least two AI technologies and that is pre-configured by the wireless access device, and the second frequency subrange is used by the wireless access device to allocate, based on the resource requirement of the UE, a resource corresponding to the AI technology.

The first particular frequency range, the second particular frequency range, and the common frequency range are frequency ranges on a same carrier. Both the first frequency subrange in the first particular frequency range and the second frequency subrange in the second particular frequency range are pre-configured by the wireless access device. The common frequency range may be a frequency range common to the at least two AI technologies. That is, the wireless access device may dynamically allocate, to the UE in real time in the common frequency range based on the resource requirement of the UE, resources corresponding to the at least two AI technologies.

Optionally, in the first to the fourth aspects, the configuration information of the at least two AI technologies includes configuration information of a Media Access Control MAC function unit, the MAC function unit includes at least one of a common MAC function unit and at least one particular MAC function unit, the common MAC function unit corresponds to the at least one particular MAC function unit or the common MAC function unit corresponds to the at least two AI technologies, and the at least one particular MAC function unit corresponds to the at least two AI technologies.

Further, in the first to the fourth aspects, the configuration information of the at least two AI technologies further includes a mapping relationship between the at least two AI technologies and logical channels.

Optionally, the MAC function unit has the following several specific implementation forms:

a. The MAC function unit includes one common MAC function unit.

b. The MAC function unit includes at least one particular MAC function unit.

c. The MAC function unit includes one common MAC function unit and at least one particular MAC function unit.

In the embodiments of the present disclosure, the UE configures, based on the configuration information sent by the wireless access device, the MAC function unit in the UE into the foregoing three forms, so that the UE can be supported in using at least two AI technologies on a same carrier, thereby improving utilization and use flexibility of resources on the same carrier.

Optionally, in the first and the third aspects, the measurement information includes a measurement object, and the measurement object is a first frequency range corresponding to each AI technology. Alternatively, the measurement information includes a measurement object and a measurement sub-object, the measurement object is a carrier corresponding to each AI technology, and the measurement sub-object is a first frequency range corresponding to each AI technology.

Further, in the first and the third aspects, the measurement information further includes at least one piece of subframe configuration information, and the at least one piece of subframe configuration information is used to instruct the UE to perform measurement on a subframe indicated by the at least one piece of subframe configuration information.

With reference to the foregoing descriptions, in the embodiments of the present disclosure, a possible implementation is that the measurement information may include one or at least two measurement objects. When the measurement information includes one measurement object, all of the at least two AI technologies correspond to the measurement object. When the measurement information includes at least two measurement objects, each AI technology corresponds to one measurement object.

Another possible implementation is that the measurement information may include one or at least two measurement objects and measurement sub-objects. Specifically, the following several combinations may be included:

A. The measurement information includes one measurement object and one measurement sub-object. All of the at least two AI technologies correspond to the measurement object and the measurement sub-object.

B. The measurement information includes one measurement object and at least two measurement sub-objects. All of the at least two AI technologies correspond to the measurement object, and each AI technology corresponds to one measurement sub-object.

C. The measurement information includes at least two measurement objects and at least two measurement sub-objects. Each AI technology corresponds to one measurement object and one measurement sub-object.

In the AI technology configuration method provided in this embodiment of the present disclosure, because measurement performed by the UE can be supported in a case of a plurality of AI technologies, UE mobility management and more efficient resource allocation can be implemented in the case of the plurality of AI technologies.

According to a fifth aspect, an embodiment of the present disclosure provides a wireless access device. The wireless access device includes at least one processor, a transceiver, a memory, and a system bus.

The memory is configured to store a computer executable instruction. The at least one processor, the memory, and the transceiver are connected and communicate with each other by using the system bus. When the wireless access device operates, the at least one processor executes the computer executable instruction stored in the memory, so that the wireless access device performs the AI technology configuration method according to any one of the first aspect or the optional implementations of the first aspect.

According to a sixth aspect, an embodiment of the present disclosure provides a computer-readable storage medium. The computer-readable storage medium stores one or more programs. The one or more programs include an instruction. When at least one processor of a wireless access device executes the instruction, the wireless access device performs the AI technology configuration method according to any one of the first aspect or the optional implementations of the first aspect.

According to a seventh aspect, an embodiment of the present disclosure provides a system chip. The system chip includes at least one processor, an input/output interface, a memory, and a bus.

The memory is configured to store a computer executable instruction. The at least one processor, the memory, and the input/output interface are connected and communicate with each other by using the bus. When the system chip operates, the at least one processor executes the computer executable instruction stored in the memory, so that the system chip performs the AI technology configuration method according to any one of the first aspect or the optional implementations of the first aspect.

For technical effects of the fifth, the sixth, and the seventh aspects, refer to related descriptions of technical effects of the first and the third aspects, and details are not described herein again.

According to an eighth aspect, an embodiment of the present disclosure provides a UE. The UE includes at least one processor, a transceiver, a memory, and a system bus.

The memory is configured to store a computer executable instruction. The at least one processor, the memory, and the transceiver are connected and communicate with each other by using the system bus. When the UE operates, the at least one processor executes the computer executable instruction stored in the memory, so that the UE performs the AI technology configuration method according to any one of the second aspect or the optional implementations of the second aspect.

According to a ninth aspect, an embodiment of the present disclosure provides a computer-readable storage medium. The computer-readable storage medium stores one or more programs. The one or more programs include an instruction. When at least one processor of the UE executes the instruction, the UE performs the AI technology configuration method according to any one of the second aspect or the optional implementations of the second aspect.

According to a tenth aspect, an embodiment of the present disclosure provides a system chip. The system chip includes at least one processor, an input/output interface, a memory, and a bus.

The memory is configured to store a computer executable instruction. The at least one processor, the memory, and the input/output interface are connected and communicate with each other by using the bus. When the system chip operates, the at least one processor executes the computer executable instruction stored in the memory, so that the system chip performs the AI technology configuration method according to any one of the second aspect or the optional implementations of the second aspect.

For technical effects of the eighth, the ninth, and the tenth aspects, refer to related descriptions of technical effects of the second and the fourth aspects, and details are not described herein again.

The system chip in the seventh and the tenth aspects may be a system on a chip (SOC), or may be another chip that can perform the AI technology configuration method according to the embodiments of the present disclosure.

Further, the system chip in the seventh aspect may be a system chip in the wireless access device in the embodiments of the present disclosure, and the system chip in the tenth aspect may be a system chip in the UE in the embodiments of the present disclosure.

According to an eleventh aspect, an embodiment of the present disclosure provides a wireless communications system. The wireless communications system includes the wireless access device according to the third aspect and the UE according to the fourth aspect. Alternatively, the wireless communications system includes the wireless access device according to the fifth aspect and the UE according to the sixth aspect.

According to a twelfth aspect, an embodiment of the present disclosure provides a wireless communications system. The wireless communications system includes the wireless access device according to the third aspect. Alternatively, the wireless communications system includes the wireless access device according to the fifth aspect.

In the wireless communications system provided in the embodiments of the present disclosure, the wireless access device may determine the at least two AI technologies that need to be configured on the same carrier and the configuration information of the at least two AI technologies, and the wireless access device may send the configuration information of the at least two AI technologies to the UE, so that the UE configures the at least two AI technologies on the same carrier. Therefore, by using the AI technology configuration method provided in the embodiments of the present disclosure, the wireless access device can be supported in configuring a plurality of AI technologies on a same carrier for the UE, so as to use the plurality of AI technologies more flexibly, and to be better adapted to application scenarios in which the plurality of AI technologies need to be used in a wireless communications system, thereby improving utilization and use flexibility of resources on the same carrier.

DESCRIPTION OF EMBODIMENTS

Figure 1:
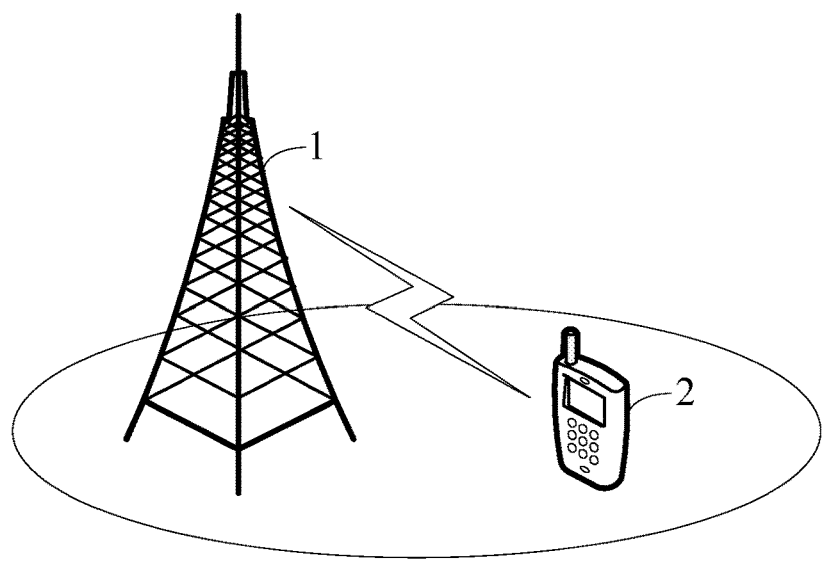
FIG. 1 is a schematic architectural diagram of a wireless communications system according to an embodiment of the present disclosure.

The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects. For example, A/B may be understood as A or B.

In the specification and claims in the embodiments of the present disclosure, the terms "first", "second", "third", "fourth", and so on are intended to distinguish between different objects but do not indicate a particular order of the objects. For example, a first particular frequency range, a second particular frequency range, and the like are intended to distinguish between different particular frequency ranges rather than to describe a particular order of the particular frequency ranges.

In the embodiments of the present disclosure, unless otherwise specially stated, "a plurality of" appeared in the following embodiments means two or more than two. For example, a plurality of wireless access devices means two or more wireless access devices. In the following embodiments of the present disclosure, "a plurality of" and "at least two" may represent a same meaning. Both can represent two or more than two, and are interchangeable.

In addition, in the embodiments of the present disclosure, the expression "exemplary" or "for example" is used to represent giving an example, an illustration, or a description. Any embodiment or design scheme described as "exemplary" or "for example" in the embodiments of the present disclosure should not be explained as being more preferred or having more advantages than another embodiment or design scheme. Exactly, use of the expression "exemplary" or "for example" or the like is intended to present a related concept in a specific manner.

In addition, the terms "include", "have", and any other variant thereof mentioned in descriptions of the embodiments of the present disclosure are intended to cover a non-exclusive inclusion. For example, a process, a method, a system, a product, or a device that includes a series of steps or units is not limited to the listed steps or units, but optionally further includes another unlisted step or unit, or optionally further includes another inherent step or unit of the process, the method, the product, or the device.

In the following description, to illustrate rather than limit, specific details such as a particular system structure, an interface, and a technology are provided to facilitate thorough understanding of this application. However, a person skilled in the art should know that this application may be implemented in other embodiments without these specific details. In other cases, detailed descriptions of well-known apparatuses, circuits, and methods are omitted, so that this application is described without being obscured by unnecessary details.

In the following embodiments of the present disclosure, "service" and "data" have a similar meaning, and are interchangeable. For example, that a UE and a wireless access device transmit a service may be understood as that the UE and the wireless access device transmit data. Alternatively, that a UE and a wireless access device transmit data may be understood as that the UE and the wireless access device transmit a service.

In the embodiments of the present disclosure, the service/data transmitted between the UE and the wireless access device may include signaling and user data. This is not specifically limited in the embodiments of the present disclosure.

An AI technology configuration method provided in the embodiments of the present disclosure may be applied to a wireless communications system. The wireless communications system may include one or more wireless access devices and a UE served by the wireless access device. Because the UE may be located within coverage of a wireless access device/some wireless access devices, there may be one or more serving cells serving the UE. When there are a plurality of serving cells serving the UE, the UE may operate in a carrier aggregation (CA) mode, a dual connectivity (DC) mode (that is, carriers in CA are provided by a plurality of base stations), or a coordinated multipoint transmission (CoMP) mode. At least one serving cell may provide at least two AI technologies, and the wireless access device may configure one or more of the at least two AI technologies for the UE. A method used by the wireless access device to configure an AI technology for the UE is the same as that in the prior art, and details are not described herein. The embodiments of the present disclosure are described only by using an example in which the wireless access device configures at least two AI technologies for the UE.

The wireless communications system provided in the embodiments of the present disclosure may be a Universal Mobile Telecommunications System (UMTS), a Code Division Multiple Access (CDMA) system, a wireless local area network (WLAN) system, a communications system using a fifth-generation mobile communications (5G) technology, or the like.

As shown in FIG. 1, FIG. 1 is a schematic architectural diagram of a possible wireless communications system according to an embodiment of the present disclosure. In the wireless communications system shown in FIG. 1, a wireless access device 1 configures an AI technology for UE 2 by using an AI technology configuration method provided in this embodiment of the present disclosure. For example, it is assumed that a wireless access device can support at least two AI technologies. The wireless access device may determine configuration information of the at least two AI technologies, and configure the at least two AI technologies for a UE by sending the configuration information of the at least two AI technologies to the UE. After the wireless access device configures the at least two AI technologies for the UE, the UE and the wireless access device may use the at least two AI technologies to transmit a service.

In this embodiment of the present disclosure, the wireless access device may be a base station, a distributed base station, a cloud radio access network (cloud RAN, CRAN) device, an access network device including a radio access network controller and a base station, or the like. The distributed base station or the CRAN device may include a baseband unit (BBU) and a remote radio unit (RRU). The CRAN device may also be a CRAN device with flexible protocol layering. The CRAN device with flexible protocol layering may specifically include an enhanced BBU and an enhanced RRU. The enhanced BBU and the enhanced RRU each may have some or all of wireless protocol layers. The wireless protocol layers include a Packet Data Convergence Protocol (PDCP) layer, a Radio Link Control (RLC) layer, a Media Access Control (MAC) layer, and a physical layer (PHY). The RRU further includes a radio frequency (RF) part.

The UE may be a wireless terminal. The wireless terminal may refer to a device that provides a user with voice and/or data connectivity, a handheld device with a wireless connection function, or another processing device connected to a wireless modem. The wireless terminal may communicate with one or more core networks by using a radio access network (RAN). The wireless terminal may be a mobile terminal, such as a mobile phone (also referred to as a "cellular" phone) and a computer with a mobile terminal, for example, may be a portable mobile apparatus, a pocket-sized mobile apparatus, a handheld mobile apparatus, a computer built-in mobile apparatus, or an in-vehicle mobile apparatus, which exchanges voice and/or data with the radio access network. For example, the wireless terminal may be a device such as a personal communications service (PCS) phone, a cordless phone, a Session Initiation Protocol (SIP) phone, a wireless local loop (WLL) station, or a personal digital assistant (PDA). The wireless terminal may also be referred to as a system, a subscriber unit, a subscriber station, a mobile station, a remote station, an access point, a remote terminal, an access terminal, a user terminal, a user agent, or a user equipment.

To describe the AI technology configuration method provided in the embodiments of the present disclosure more clearly and conveniently, all of the following method embodiments are described by using an example in which a wireless access device is a base station. Certainly, the base station in the following method embodiments may alternatively be replaced with the foregoing distributed base station, the CRAN device, or the access network device including the radio access network controller and the base station, and details are not described in the embodiments of the present disclosure again.

Figure 2:
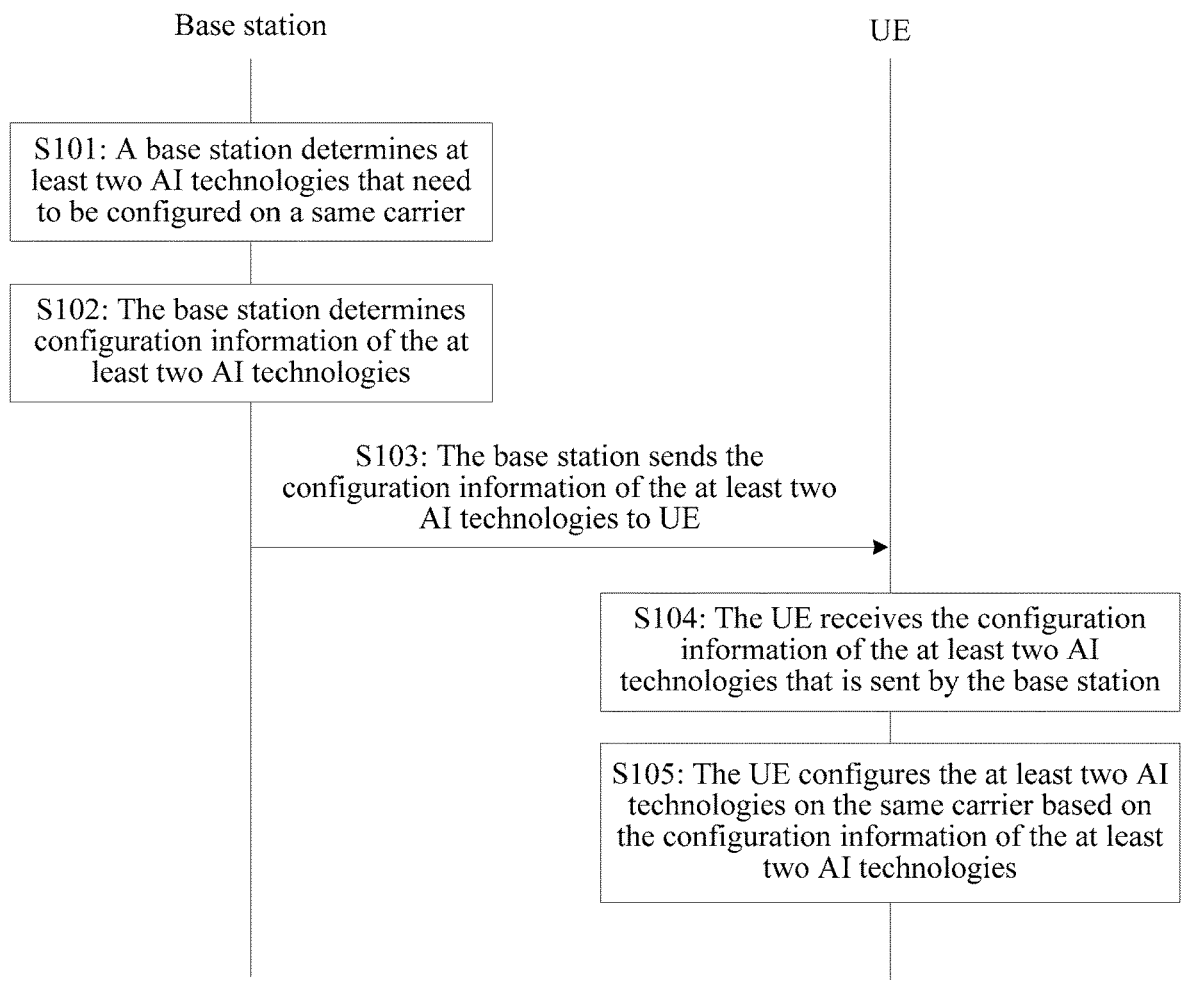
FIG. 2 is a first schematic diagram of an AI technology configuration method according to an embodiment of the present disclosure.

For example, based on the schematic architectural diagram of the wireless communications system shown in FIG. 1, as shown in FIG. 2, an embodiment of the present disclosure provides an AI technology configuration method. The method may include the following steps:

S101: A base station determines at least two AI technologies that need to be configured on a same carrier.

S102: The base station determines configuration information of the at least two AI technologies.

S103: The base station sends the configuration information of the at least two AI technologies to the UE.

S104: The UE receives the configuration information of the at least two AI technologies that is sent by the base station.

S105: The UE configures the at least two AI technologies on the same carrier based on the configuration information of the at least two AI technologies.

In the AI technology configuration method provided in this embodiment of the present disclosure, the base station may determine the at least two AI technologies that need to be configured on the same carrier and the configuration information of the at least two AI technologies, and the base station may send the configuration information of the at least two AI technologies to the UE, so that the UE configures the at least two AI technologies on the same carrier. Therefore, by using the AI technology configuration method provided in this embodiment of the present disclosure, the base station can be supported in configuring a plurality of AI technologies on a same carrier for the UE, so as to use the plurality of AI technologies more flexibly, and to be better adapted to application scenarios in which the plurality of AI technologies need to be used in a wireless communications system, thereby improving utilization and use flexibility of resources on the same carrier.

The application scenarios in which the plurality of AI technologies need to be used in this embodiment of the present disclosure may include a scenario in which a plurality of AI technologies are used on one carrier, or may include a scenario in which a plurality of AI technologies are used on a plurality of carriers (a CA scenario, a DC scenario, a CoMP scenario, or the like). In the scenario in which the plurality of AI technologies are used on the plurality of carriers, the plurality of AI technologies are used on at least one of the plurality of carriers.

In this embodiment of the present disclosure, the base station supports at least two AI technologies. The AI technology may also be referred to as a radio interface technology (RIT) or a radio interface protocol (RIP). The AI technology may usually include a multiple access scheme, a modulation and coding scheme (MCS), a frame structure, a physical channel, a transport channel, a logical channel, MAC, RLC, the PDCP, Radio Resource Control (RRC), and the like.

The foregoing multiple access scheme may include a Time Division Multiple Access (TDMA) scheme, a Frequency Division Multiple Access (FDMA) scheme, Code Division Multiple Access (CDMA), an orthogonal frequency division multiple access (OFDMA) scheme, a single carrier frequency division multiple access (SC-FDMA) scheme, and the like.

The foregoing frame structure usually refers to a format of transmitting data on a physical layer and a corresponding parameter. Different wireless communications systems usually use respective particular frame structures. For example, a frame structure of a 3rd Generation Partnership Project (3GPP) Long Term Evolution (LTE) system includes a type I (Type I) frame structure used for frequency division multiplexing (FDD) and a type II (Type II) frame structure used for time division multiplexing (TDD). The type I frame structure and the type II frame structure each include ten subframes having a length of 1 ms. A main difference between the type I frame structure and the type II frame structure lies in that a special subframe is introduced into the type II frame structure. The special subframe includes three special timeslots: a downlink pilot timeslot (DwPTS), a guard period (GP), and an uplink pilot timeslot (UpPTS). The DwPTS is always used to send downlink data, the UpPTS is always used to send uplink data, and the GP is a guard time period for downlink-to-uplink conversion. Subframes in the type I frame structure are classified into an uplink subframe and a downlink subframe based on different frequency ranges. The uplink subframe and the downlink subframe can be used simultaneously at any transmission time interval (TTI). Subframes in the type II frame structure are classified into an uplink subframe and a downlink subframe. Only the uplink subframe or the downlink subframe can be used at any TTI, and a time length of one TTI is equal to a time length of one subframe.

In this embodiment of the present disclosure, the at least two AI technologies means that at least one of the foregoing plurality of AI technologies is different from the others. For example, if the base station supports at least two frame structures, for example, the type I frame structure and the type II frame structure, it may be considered that the base station supports at least two AI technologies. If the base station supports at least one frame structure and at least one multiple access scheme, for example, the type I frame structure and the CDMA scheme, it may also be considered that the base station supports at least two AI technologies.

In this embodiment of the present disclosure, the at least two AI technologies that need to be configured on the same carrier and that is determined by the base station in S101 is at least two AI technologies that can be supported by the base station.

After the base station determines the at least two AI technologies that need to be configured on the same carrier, in S102, the base station may determine the configuration information of the at least two AI technologies. As shown in S103, the base station sends the configuration information of the at least two AI technologies to the UE, so that the UE configures the at least two AI technologies on the same carrier based on the configuration information of the at least two AI technologies, as shown in S104 and S105.

Optionally, in this embodiment of the present disclosure, to support configuration of at least two AI technologies on one carrier, corresponding technical support is also required on a physical layer. For example, on the physical layer, a filtered orthogonal division multiplexing (filtered OFDM) technology is used to isolate different AI technologies. The different AI technologies may be configured by using different OFDM parameters, for example, different subcarrier spacings, different subframe lengths, and different cyclic prefix (CP) lengths. Corresponding technical support is also required in terms of a higher layer protocol function. For example, a suitable MAC protocol is required to match a service with an AI technology based on different service features, thereby allocating radio resources to a plurality of different AI technologies.

In this embodiment of the present disclosure, the configuration information of the at least two AI technologies may be one of the following:

(1) The configuration information of the at least two AI technologies includes a first particular frequency range and a common frequency range. The first particular frequency range includes a first frequency subrange that corresponds to the at least two AI technologies and that is pre-configured by the base station. The first frequency subrange is used to transmit control information corresponding to the at least two AI technologies. The common frequency range is used by the base station to allocate, based on a resource requirement of the UE, resources corresponding to the at least two AI technologies.

In the foregoing (1), the first particular frequency range and the common frequency range are frequency ranges on a same carrier. There may be one or at least two first frequency subranges. When there is one first frequency subrange, the first frequency subrange may be used to transmit the control information corresponding to the at least two AI technologies. That is, the control information corresponding to the at least two AI technologies is all transmitted in the first frequency subrange. When there are at least two first frequency subranges, the at least two first frequency subranges are in a one-to-one correspondence with the at least two AI technologies. That is, one first frequency subrange is used to transmit control information corresponding to one AI technology. Alternatively, when there are at least two first frequency subranges, one of the at least two first frequency subranges corresponds to some of the at least two AI technologies, and other first frequency subranges in the at least two first frequency subranges than the one first frequency subrange correspond to other AI technologies in the at least two AI technologies than the some AI technologies.

The control information may be used to indicate resource allocation information that corresponds to each AI technology and that is allocated by the base station to the UE. The control information may be indicated by using a physical downlink control channel (PDCCH) or an enhanced PDCCH (EPDCCH). That is, the base station may send the resource allocation information corresponding to each AI technology to the UE by using the PDCCH or the EPDCCH.

The first frequency subrange in the first particular frequency range is pre-configured by the base station. The common frequency range may be a frequency range common to the at least two AI technologies. That is, the base station may dynamically allocate, to the UE in real time in the common frequency range based on the resource requirement of the UE, the resources corresponding to the at least two AI technologies.

Figure 3:
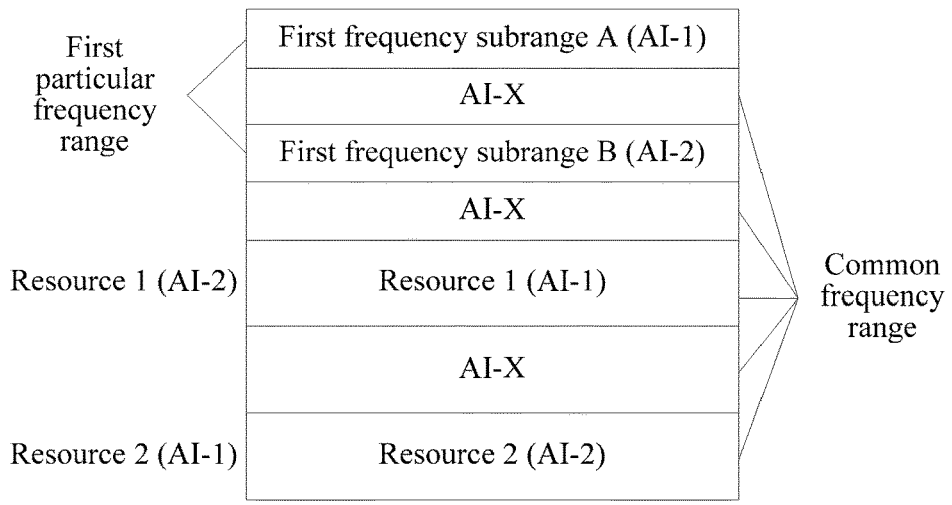
FIG. 3 is a first schematic diagram of configuration information according to an embodiment of the present disclosure.

For example, as shown in FIG. 3, the base station may pre-configure a first frequency subrange A and a first frequency subrange B in the first particular frequency range on the carrier. The first frequency subrange A is used to transmit control information corresponding to AI-1, and the first frequency subrange B is used to transmit control information corresponding to AI-2. The base station may dynamically allocate resources in the common frequency range on the carrier based on the resource requirement of the UE in real time. For example, at one moment, the base station may allocate, to the UE based on the resource requirement of the UE, a resource 1 corresponding to AI-1 and a resource 2 corresponding to AI-2 in the common frequency range on the carrier. At another moment, the base station may allocate, to the UE based on the resource requirement of the UE, a resource 2 corresponding to AI-1 and a resource 1 corresponding to AI-2 in the common frequency range on the carrier. In this way, resources in the common frequency range can be dynamically allocated in real time based on the resource requirement of the UE, thereby improving resource utilization and providing a more flexible way of using the resources.

It should be noted that the frequency range mentioned in the foregoing (1) may alternatively be a time range. In other words, in the AI technology configuration method provided in this embodiment of the present disclosure, a time range may alternatively be configured for the at least two AI technologies. Specifically, a first particular time range and a common time range may be configured for the at least two AI technologies. In other words, the configuration information of the at least two AI technologies provided in this embodiment of the present disclosure may include the first particular time range and the common time range. The first particular time range includes a first time subrange that corresponds to the at least two AI technologies and that is pre-configured by the base station. The first time subrange is used to transmit control information corresponding to the at least two AI technologies. The common time range is used by the base station to allocate, based on the resource requirement of the UE, the resources corresponding to the at least two AI technologies.

It may be understood that the common frequency range is specifically used by the base station to allocate, based on the resource requirement of the UE, frequency resources corresponding to the at least two AI technologies. The common time range is specifically used by the base station to allocate, based on the resource requirement of the UE, time resources corresponding to the at least two AI technologies.

Figure 3A:
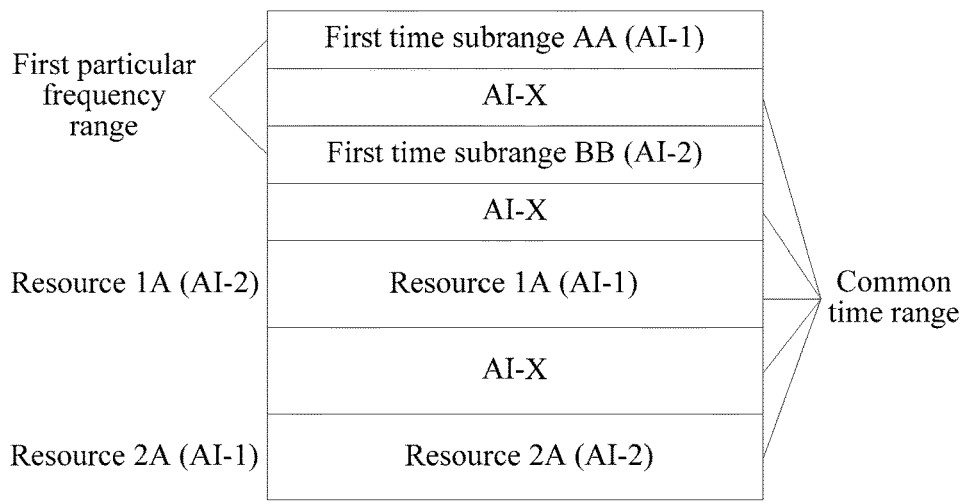
FIG. 3A is a second schematic diagram of configuration information according to an embodiment of the present disclosure.

For example, as shown in FIG. 3A, the base station may pre-configure a first time subrange AA and a first time subrange BB in the first particular time range on the carrier. The first time subrange AA is used to transmit control information corresponding to AI-1, and the first time subrange BB is used to transmit control information corresponding to AI-2. The base station may dynamically allocate resources in the common time range on the carrier based on the resource requirement of the UE in real time. For example, at one moment, the base station may allocate, to the UE based on the resource requirement of the UE, a resource 1A corresponding to AI-1 and a resource 2A corresponding to AI-2 in the common time range on the carrier. At another moment, the base station may allocate, to the UE based on the resource requirement of the UE, a resource 2A corresponding to AI-1 and a resource 1A corresponding to AI-2 in the common time range on the carrier. In this way, resources in the common time range can be dynamically allocated in real time based on the resource requirement of the UE, thereby improving resource utilization and providing a more flexible way of using the resources.

For other descriptions of the time range, refer to related descriptions of the first frequency range and the first frequency subrange in the foregoing embodiment, and details are not described herein again.

In the AI technology configuration method provided in this embodiment of the present disclosure, a frequency range and a time range may alternatively be configured for the at least two AI technologies. Specifically, a first particular frequency range, a common frequency range, a first particular time range, and a common time range may be configured for the at least two AI technologies. In other words, the configuration information of the at least two AI technologies may include the first particular frequency range, the common frequency range, the first particular time range, and the common time range.

In the AI technology configuration method provided in this embodiment of the present disclosure, specific content of the configuration information of the at least two AI technologies may be determined based on an actual use requirement. This is not limited in this embodiment of the present disclosure.

(2) The configuration information of the at least two AI technologies includes a first particular frequency range, a second particular frequency range, and a common frequency range. The first particular frequency range includes a first frequency subrange that corresponds to the at least two AI technologies and that is pre-configured by the base station. The first frequency subrange is used to transmit control information corresponding to the at least two AI technologies. The second particular frequency range includes a second frequency subrange that corresponds to each of the at least two AI technologies and that is pre-configured by the base station. The second frequency subrange is used by the base station to allocate, based on the resource requirement of the UE, a resource corresponding to the AI technology. The common frequency range is used by the base station to allocate, based on a resource requirement of the UE, resources corresponding to the at least two AI technologies.

In the foregoing (2), the first particular frequency range, the second particular frequency range, and the common frequency range are frequency ranges on a same carrier. The second frequency subrange in the second particular frequency range is also pre-configured by the base station.

For descriptions of the first particular frequency range, the first frequency subrange, and the common frequency range, specifically refer to related descriptions of the first particular frequency range, the first frequency subrange, and the common frequency range in the foregoing (1), and details are not described herein again.

There may be at least two second frequency subranges. When there are at least two second frequency subranges, the at least two second frequency subranges are in a one-to-one correspondence with the at least two AI technologies. That is, one second frequency subrange is used by the base station to transmit, based on the resource requirement of the UE, a resource corresponding to one AI technology. Alternatively, when there are at least two second frequency subranges, one of the at least two second frequency subranges corresponds to some of the at least two AI technologies, and other second frequency subranges in the at least two second frequency subranges than the one second frequency subrange correspond to other AI technologies in the at least two AI technologies than the some AI technologies.

It should be noted that, when the base station allocates, to the UE in a second frequency subrange, a resource corresponding to an AI technology, if the resource in the second frequency subrange cannot satisfy the resource requirement of the UE, the base station may further allocate, to the UE in the common frequency range, a resource corresponding to the AI technology.

Figure 4:
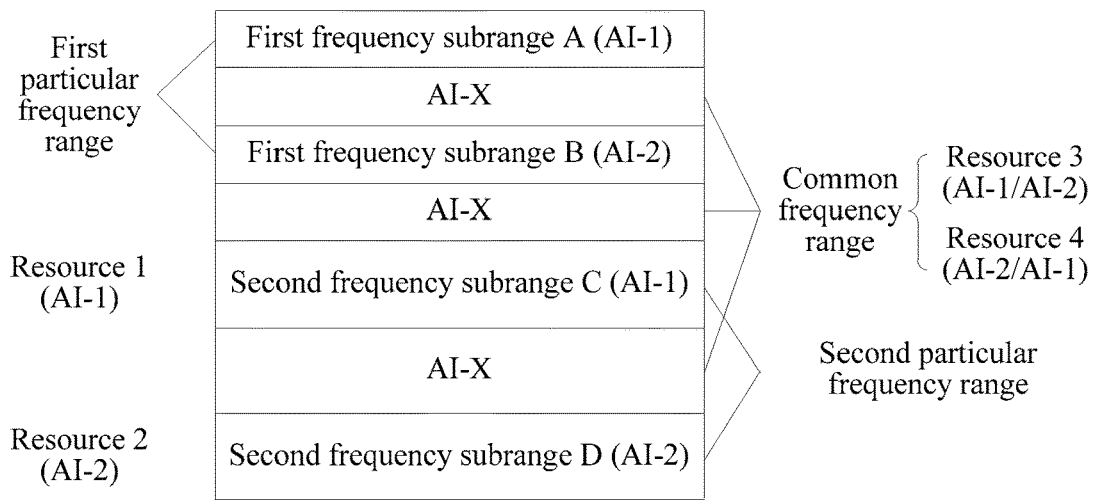
FIG. 4 is a third schematic diagram of configuration information according to an embodiment of the present disclosure.

For example, as shown in FIG. 4, the base station may pre-configure a first frequency subrange A and a first frequency subrange B in the first particular frequency range on the carrier. The first frequency subrange A is used to transmit control information corresponding to AI-1, and the first frequency subrange B is used to transmit control information corresponding to AI-2. The base station may pre-configure a second frequency subrange C and a second frequency subrange D in the second particular frequency range on the carrier. The second frequency subrange C is used by the base station to allocate, based on the resource requirement of the UE, a resource 1 corresponding to AI-1, and the second frequency subrange D is used by the base station to allocate, based on the resource requirement of the UE, a resource 2 corresponding to AI-2. The base station may dynamically allocate resources in the common frequency range on the carrier based on the resource requirement of the UE in real time. For example, in a TTI, if resources in the second frequency subrange C and the second frequency subrange D cannot satisfy the resource requirement of the UE, the base station may further allocate, to the UE in the common frequency range on the carrier, a resource 3 corresponding to AI-1 and a resource 4 corresponding to AI-2. At another moment, if the resources in the second frequency subrange C and the second frequency subrange D still cannot satisfy the resource requirement of the UE, the base station may further allocate, to the UE in the common frequency range on the carrier, the resource 4 corresponding to AI-1 and the resource 3 corresponding to AI-2. In this way, resources in the common frequency range can be dynamically allocated in real time based on the resource requirement of the UE, thereby improving resource utilization and providing a more flexible way of using the resources.

It should be noted that the frequency range mentioned in the foregoing (2) may alternatively be a time range. In other words, in the AI technology configuration method provided in this embodiment of the present disclosure, a time range may alternatively be configured for the at least two AI technologies. Specifically, a first particular time range, a second particular time range, and a common time range may be configured for the at least two AI technologies. In other words, the configuration information of the at least two AI technologies provided in this embodiment of the present disclosure may include the first particular time range, the second particular time range, and the common time range. The second particular time range includes a second time subrange that corresponds to each of the at least two AI technologies and that is pre-configured by the base station, and the second time subrange is used by the base station to allocate, based on the resource requirement of the UE, a resource corresponding to the AI technology.

It may be understood that the second time subrange is specifically used by the base station to allocate, based on the resource requirement of the UE, a time resource corresponding to the AI technology.

For descriptions of the first particular time range and the common time range, refer to related descriptions of the first particular time range and the common time range in the foregoing (1), and details are not described herein again.

In the AI technology configuration method provided in this embodiment of the present disclosure, a frequency range and a time range may alternatively be configured for the at least two AI technologies. Specifically, a first particular frequency range, a second particular frequency range, a common frequency range, a first particular time range, a second particular time range, and a common time range may be configured for the at least two AI technologies. In other words, the configuration information of the at least two AI technologies may include the first particular frequency range, the second particular frequency range, the common frequency range, the first particular time range, the second particular time range, and the common time range.

In the AI technology configuration method provided in this embodiment of the present disclosure, specific content of the configuration information of the at least two AI technologies may be determined based on an actual use requirement. This is not limited in this embodiment of the present disclosure.

(3) The configuration information of the at least two AI technologies includes configuration information of a MAC function unit. The MAC function unit includes at least one of a common MAC function unit and at least one particular MAC function unit. The common MAC function unit corresponds to the at least one particular MAC function unit or the common MAC function unit corresponds to the at least two AI technologies. The at least one particular MAC function unit corresponds to the at least two AI technologies.

Optionally, the configuration information of the at least two AI technologies further includes a mapping relationship between the at least two AI technologies and logical channels.

In the foregoing (3), the MAC function unit has the following several specific implementation forms:

a. The MAC function unit includes one common MAC function unit.

Figure 5:
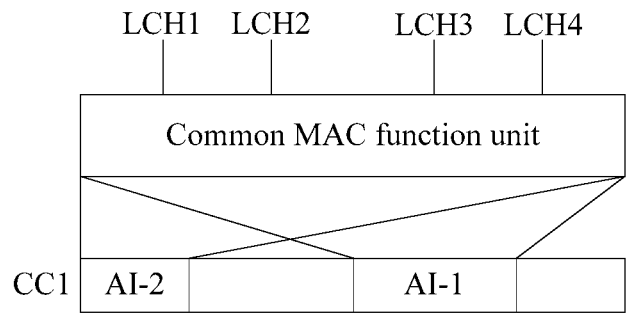
FIG. 5 is a fourth schematic diagram of configuration information according to an embodiment of the present disclosure.

As shown in FIG. 5, in this embodiment, the MAC function unit may include only one common MAC function unit. The common MAC function unit corresponds to the at least two AI technologies. That is, the common MAC function unit is used to process information corresponding to the at least two AI technologies.

b. The MAC function unit includes at least one particular MAC function unit.

Figure 6:
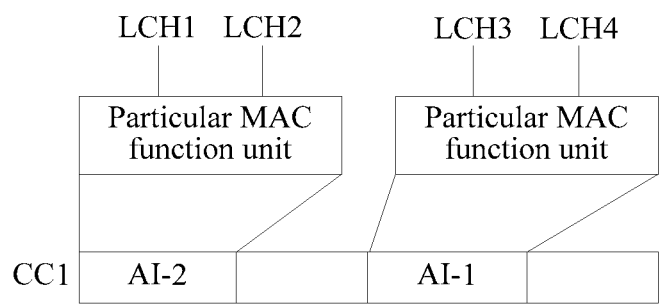
FIG. 6 is a fifth schematic diagram of configuration information according to an embodiment of the present disclosure.

As shown in FIG. 6, in this embodiment, the MAC function unit may include at least one particular MAC function unit. The at least one particular MAC function unit corresponds to the at least two AI technologies. That is, the at least one particular MAC function unit is used to process information corresponding to the at least two AI technologies. In FIG. 6, only two AI technologies and a MAC function unit including two particular MAC function units are used as an example for description. In FIG. 6, the two particular MAC function units are in a one-to-one correspondence with the two AI technologies, and each particular MAC function unit is used to process information corresponding to one AI technology. A case in which the MAC function unit includes more than two particular MAC function units is similar to that in FIG. 6, and details are not described herein again.

Specifically, when the MAC function unit includes only one particular MAC function unit, a function of the particular MAC function unit is the same as a function of the common MAC function unit in the foregoing a, and details are not described herein again. When the MAC function unit includes at least two particular MAC function units, the at least two particular MAC function units are in a one-to-one correspondence with the at least two AI technologies. In other words, each particular MAC function unit corresponds to one AI technology, and each particular MAC function unit is used to process information corresponding to one AI technology.

c. The MAC function unit includes one common MAC function unit and at least one particular MAC function unit.

Figure 7:
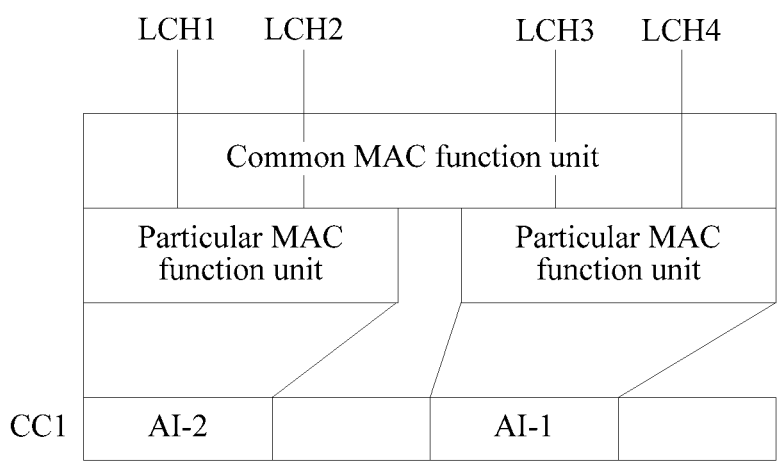
FIG. 7 is a sixth schematic diagram of configuration information according to an embodiment of the present disclosure.

As shown in FIG. 7, in this embodiment, the MAC function unit may include one common MAC function unit and at least one particular MAC function unit. The common MAC function unit corresponds to the at least one particular MAC function unit, and the at least one particular MAC function unit is in a one-to-one correspondence with the at least two AI technologies. In FIG. 7, only two AI technologies and two particular MAC function units are used as an example for description. In FIG. 7, the two particular MAC function units are in a one-to-one correspondence with the two AI technologies, and each particular MAC function unit is used to process information corresponding to one AI technology. A case in which the MAC function unit includes more than two particular MAC function units is similar to that in FIG. 7, and details are not described herein again.

For specific descriptions of the at least one particular MAC function unit, refer to related descriptions of the at least one particular MAC function unit in the foregoing b, and details are not described herein again.

In addition, FIG. 5, FIG. 6, and FIG. 7 further show a correspondence between logical channels (LCH) and the at least two AI technologies. For example, as shown in FIG. 5, LCH1, LCH2, LCH3, and LCH4 all correspond to AI-1 and AI-2. As shown in FIG. 6 and FIG. 7, LCH1 and LCH2 correspond to AI-2, and LCH3 and LCH4 correspond to AI-1.

It should be noted that FIG. 5, FIG. 6, and FIG. 7 are described by using only one carrier (for example, a carrier 1 or CC1) as an example. In an actual application, a plurality of carriers may further be included, and at least two AI technologies such as AI-1 and AI-2 are used on each carrier.

In this embodiment of the present disclosure, the UE configures, based on the configuration information sent by the base station, the MAC function unit in the UE into the foregoing three forms, so that the UE can be supported in using at least two AI technologies on a same carrier, thereby improving utilization and use flexibility of resources on the same carrier.

Optionally, in this embodiment of the present disclosure, the base station may send the configuration information of the at least two AI technologies to the UE by using an RRC connection reconfiguration message.

Specifically, first, the base station initially configures AI-1 for the UE. For example, AI-1 may be an AI technology supported by a Long Term Evolution (LTE) system. Then, the UE establishes, according to the prior art, an RRC connection to the base station (refer to an RRC connection establishment process in the prior art, and details are not described herein). Finally, the base station sends an RRC connection reconfiguration message to the UE. The RRC connection reconfiguration message includes the configuration information of the at least two AI technologies that need to be configured.

For example, an index of a carrier on which each of the at least two AI technologies is located (that is, an association between the AI technology and a cell, where the index may be, for example, a carrier 1 or CC1), a physical cell identifier of a cell corresponding to each AI technology, configuration information of an EPDCCH corresponding to each AI technology, configuration information of a physical shared channel (PSCH) corresponding to each AI technology, configuration information of a PUCCH corresponding to each AI technology, configuration information of a sounding reference signal (SRS), configuration information of radio resource management (RRM) measurement, configuration information of channel state information (CSI) measurement, configuration information of cross-carrier scheduling, and the like may be indicated in an AI technology addition/modification message list (AIToAddModList) in the RRC connection reconfiguration message. The foregoing configuration information is associated with the configuration information of the AI technology. The configuration information of the AI technology mainly includes most basic physical-layer configuration information such as a frame structure, a multiple access scheme, and a waveform. In addition, the base station may add universal radio resource configuration information of each AI technology to system information (SI).

Optionally, the base station may further perform an activation or a deactivation operation on the AI technology. For example, after the UE completes service transmission by using AI-1, if the UE temporarily has no other service requirement for AI-1, the base station may deactivate AI-1 for the UE. Further, after the base station deactivates AI-1, the UE no longer communicates with the base station by using AI-1. For example, the UE no longer receives data by using AI-1, or no longer sends data by using AI-1. After a period of time, if the UE still has another service requirement for AI-1, the base station may activate AI-1 for the UE again.

Further, it is assumed that the UE uses AI-1 in a cell 1. When the UE is handed over from the cell 1 to a cell 2, a base station serving the cell 2 may configure AI-2 for the UE. In addition, when the UE does not use AI-2 for any service, the base station may delete AI-2 and a resource that corresponds to AI-2 and that is allocated by the base station to the UE.

In this embodiment of the present disclosure, the base station may activate or deactivate the AI technology, and the base station may delete an AI that is not required and a resource corresponding to the AI technology. Therefore, use flexibility of a plurality of AI technologies can be improved, and a resource on a carrier can be relatively flexibly used when the base station supports a plurality of AI technologies, thereby improving resource utilization.

Figure 8:
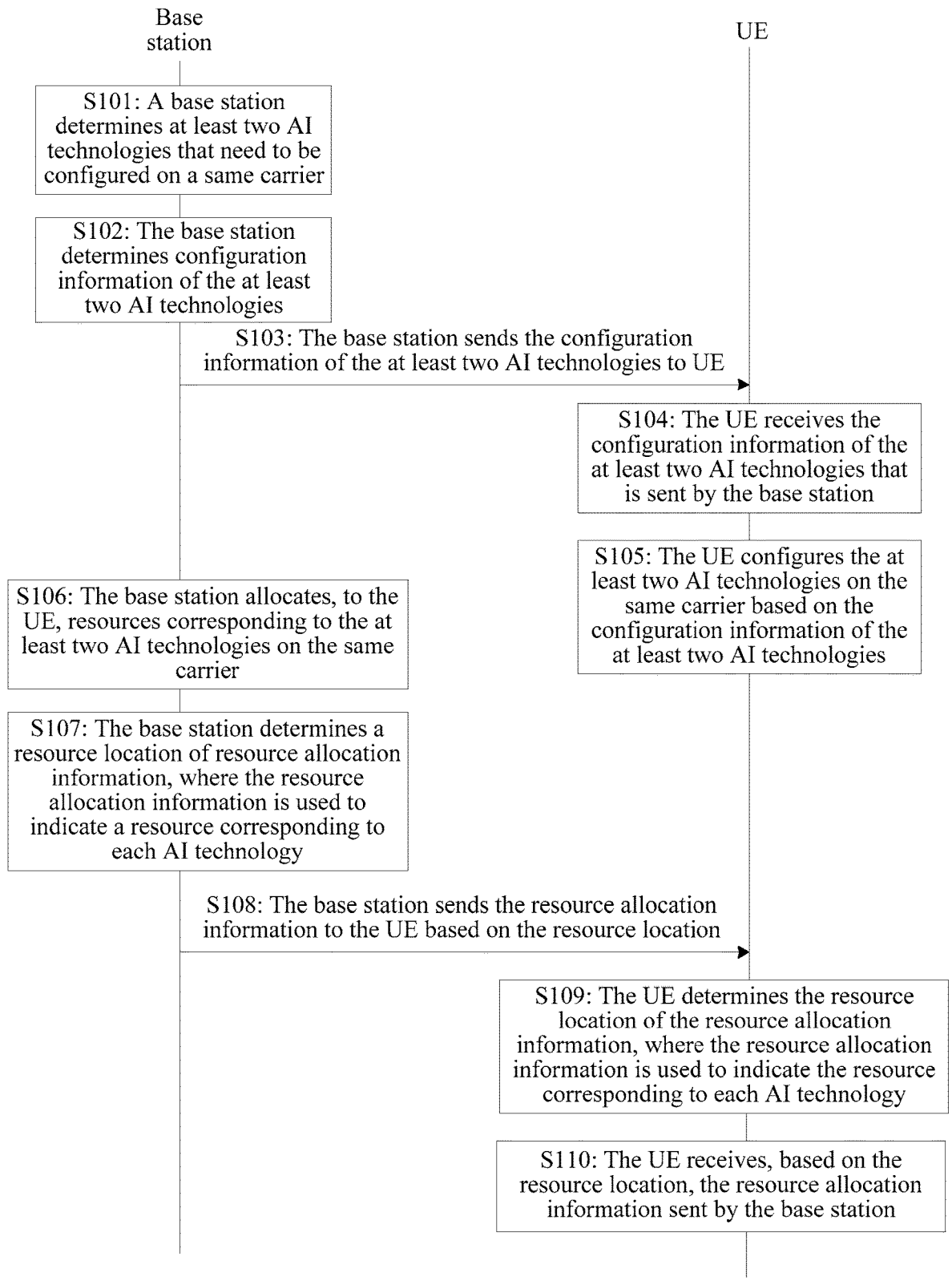
FIG. 8 is a second schematic diagram of an AI technology configuration method according to an embodiment of the present disclosure.

Optionally, with reference to FIG. 2, as shown in FIG. 8, the AI technology configuration method provided in this embodiment of the present disclosure may further include the following steps.

S106: The base station allocates, to the UE, resources corresponding to the at least two AI technologies on the same carrier.

S107: The base station determines a resource location of resource allocation information, where the resource allocation information is used to indicate a resource corresponding to each AI technology.

In this embodiment of the present disclosure, S107 may be specifically implemented as one of the following:

S107a: The base station determines a resource location of resource allocation information based on a preset subcarrier spacing and a TTI length corresponding to each of the at least two AI technologies, where the resource allocation information is used to indicate a resource corresponding to the AI technology.

For example, it is assumed that the at least two AI technologies include AI-1 and AI-2. In this case, by using the method in S107a, the base station may determine, based on the preset subcarrier spacing and a TTI length corresponding to AI-1, a resource location of resource allocation information corresponding to AI-1. The resource allocation information is used to indicate a resource corresponding to AI-1. Correspondingly, the base station may determine, based on the preset subcarrier spacing and a TTI length corresponding to AI-2, a resource location of resource allocation information corresponding to AI-2. The resource allocation information is used to indicate a resource corresponding to AI-2.

S107b: The base station determines a resource location of resource allocation information based on a subcarrier spacing for each of the at least two AI technologies and a TTI length for the AI technology, where the resource allocation information is used to indicate a resource corresponding to the AI technology.

For example, it is assumed that the at least two AI technologies include AI-1 and AI-2. In this case, by using the method in S107b, the base station may determine a resource location of resource allocation information for AI-1 based on a subcarrier spacing for AI-1 and a TTI length for AI-1. The resource allocation information is used to indicate a resource corresponding to AI-1. Correspondingly, the base station may determine a resource location of resource allocation information for AI-2 based on a subcarrier spacing for AI-2 and a TTI length for AI-2. The resource allocation information is used to indicate a resource corresponding to AI-2.

S107c: The base station determines, in a first frequency subrange corresponding to each of the at least two AI technologies, a resource location of resource allocation information based on a subcarrier spacing for the AI technology and a TTI length for the AI technology, where the resource allocation information is used to indicate a resource corresponding to the AI technology.

For example, it is assumed that the at least two AI technologies include AI-1 and AI-2. In this case, by using the method in S107c, the base station may determine, in a first frequency subrange corresponding to AI-1, a resource location of resource allocation information for AI-1 based on a subcarrier spacing for AI-1 and a TTI length for AI-1. The resource allocation information is used to indicate a resource corresponding to AI-1. Correspondingly, the base station may determine, in a first frequency subrange corresponding to AI-2, a resource location of resource allocation information for AI-2 based on a subcarrier spacing for AI-2 and a TTI length for AI-2. The resource allocation information is used to indicate a resource corresponding to AI-2.

It should be noted that S107a and S107b correspond to a case in which there is one first frequency subrange, and S107c corresponds to a case in which there are at least two first frequency subranges.

S108: The base station sends the resource allocation information to the UE based on the resource location.

S109: The UE determines the resource location of the resource allocation information, where the resource allocation information is used to indicate the resource corresponding to each AI technology.

In S109, a method used by the UE to determine the resource location of the resource allocation information is similar to the method used by the base station to determine the resource location of the resource allocation information shown in S107. For specific descriptions, refer to related descriptions in S107a, S107b, and S107c, and details are not described herein again.

It should be noted that no limitation is imposed on an execution sequence of S106 to S108 and S109 in this embodiment of the present disclosure. That is, in this embodiment of the present disclosure, S106 to S108 may be first performed and S109 may be then performed, or S109 may be first performed and S106 to S108 may be then performed. Alternatively, S106 to S108 and S109 may be performed simultaneously.

S110: The UE receives, based on the resource location, the resource allocation information sent by the base station.

After the base station determines the resource location of the resource allocation information corresponding to each AI technology, the base station may send, based on the resource location, the resource allocation information to the UE. Correspondingly, after the UE determines the resource location of the resource allocation information corresponding to each AI technology, the UE may receive, based on the resource location, the resource allocation information sent by the base station, so that the UE may determine, based on the resource allocation information, the resource corresponding to each AI technology.

In this embodiment of the present disclosure, the base station and the UE may pre-agree on a method for determining the resource location of the resource allocation information. That is, the base station and the UE may pre-agree to use a same method to determine the resource location of the resource allocation information. For example, the base station and the UE may pre-agree to use the method shown in S107a to determine the resource location of the resource allocation information, the base station and the UE may pre-agree to use the method shown in S107b to determine the resource location of the resource allocation information, or the base station and the UE may pre-agree to use the method shown in S107c to determine the resource location of the resource allocation information. Specifically, agreement/selection may be performed based on an actual use requirement. This is not limited in this embodiment of the present disclosure.

In this embodiment of the present disclosure, the base station and the UE may determine the resource location of the resource allocation information based on a pre-agreed method. Therefore, when the base station sends the resource allocation information at the resource location to the UE, the UE can receive the resource allocation information at the resource location. Further, the UE can learn of, based on the resource allocation information, a resource allocated by the base station to the UE, and can transmit a service on the resource.

Optionally, after S110, the AI technology configuration method provided in this embodiment of the present disclosure may further include the following steps:

S201: The UE determines a resource indicated by the resource allocation information.

S202: The UE and the base station transmit a service on the resource.

In this embodiment of the present disclosure, after the UE receives the resource allocation information sent by the base station, the UE may determine the resource indicated by the resource allocation information. Specifically, the resource indicated by the resource allocation information is used by the UE and the base station to transmit a service, and usually, the UE and the base station may transmit a service by using a physical downlink shared channel (PDSCH) or a physical uplink shared channel (PUSCH). Therefore, the UE may determine a resource indicated by the resource allocation information on the PDSCH or the PUSCH. If the UE and the base station transmit a downlink service, the UE and the base station may transmit the downlink service on a PDSCH. If the UE and the base station transmit an uplink service, the UE and the base station may transmit the uplink service on a PUSCH.

Optionally, in this embodiment of the present disclosure, S201 may be specifically implemented as at least one of S201a, S201b, and S201c.

S201a: The UE determines, based on the preset subcarrier spacing and the TTI length corresponding to each of the at least two AI technologies, a resource indicated by the resource allocation information.

S201b: The UE determines, based on the subcarrier spacing for each of the at least two AI technologies and the TTI length for the AI technology, a resource indicated by the resource allocation information.

S201c: The UE determines, in the second frequency subrange corresponding to each of the at least two AI technologies, and based on the subcarrier spacing for the AI technology and the TTI length for the AI technology, a resource indicated by the resource allocation information.

For descriptions of S201a, specifically refer to related descriptions in S107a. For descriptions of S201b, specifically refer to related descriptions in S107b. For descriptions of S201c, specifically refer to related descriptions in S107c. Details are not described herein again.

Optionally, with reference to FIG. 2, the AI technology configuration method provided in this embodiment of the present disclosure may further include the following step:

S111: The base station sends, to the UE, measurement information corresponding to the at least two AI technologies, where the measurement information is used to instruct the UE to perform measurement.

Optionally, in this embodiment of the present disclosure, the measurement information may specifically have the following several possible implementation forms:

A possible implementation is that the measurement information includes a measurement object, and the measurement object is a first frequency range corresponding to each AI technology.

In this embodiment of the present disclosure, the measurement information may include one or at least two measurement objects. When the measurement information includes one measurement object, all of the at least two AI technologies correspond to the measurement object. When the measurement information includes at least two measurement objects, each AI technology corresponds to one measurement object.

For example, if there is one measurement object, there is one first frequency range. For each AI technology, the UE may perform measurement in the first frequency range. If there are at least two measurement objects, there are at least two first frequency ranges. For each AI technology, the UE may perform measurement in a first frequency range corresponding to the AI technology.

Another possible implementation is that the measurement information includes a measurement object and a measurement sub-object, the measurement object is a carrier corresponding to each AI technology, and the measurement sub-object is a first frequency range corresponding to each AI technology.

In this embodiment of the present disclosure, the measurement information may include one or at least two measurement objects and measurement sub-objects. Specifically, the following several combinations may be included:

A. The measurement information includes one measurement object and one measurement sub-object. All of the at least two AI technologies correspond to the measurement object and the measurement sub-object.

For example, if there is one measurement object and one measurement sub-object, there is one carrier and one first frequency range. For each AI technology, the UE may perform measurement in the first frequency range on the carrier.

B. The measurement information includes one measurement object and at least two measurement sub-objects. All of the at least two AI technologies correspond to the measurement object, and each AI technology corresponds to one measurement sub-object.

For example, if there is one measurement object and at least two measurement sub-objects, there is one carrier and at least two first frequency ranges. For each AI technology, the UE may perform measurement in a first frequency range corresponding to the AI technology on the carrier.

C. The measurement information includes at least two measurement objects and at least two measurement sub-objects. Each AI technology corresponds to one measurement object and one measurement sub-object.

For example, if there are at least two measurement objects and at least two measurement sub-object, there are at least two carriers and at least two first frequency ranges. For each AI technology, the UE may perform measurement in a first frequency range corresponding to the AI technology on a carrier.

Optionally, in this embodiment of the present disclosure, the measurement information may further include at least one piece of subframe configuration information, and the at least one piece of subframe configuration information is used to instruct the UE to perform measurement on a subframe indicated by the at least one piece of subframe configuration information.

For example, when the measurement information includes one piece of subframe configuration information, all AI technologies correspond to the subframe configuration information. That is, for each AI technology, the UE performs measurement on a subframe indicated by the subframe configuration information. When the measurement information includes at least two pieces of subframe configuration information, each AI technology corresponds to one piece of subframe configuration information. That is, for each AI technology, the UE performs measurement on a subframe indicated by subframe configuration information corresponding to the AI technology.

In the AI technology configuration method provided in this embodiment of the present disclosure, because measurement performed by the UE can be supported in a case of a plurality of AI technologies, UE mobility management and more efficient resource allocation can be implemented in the case of the plurality of AI technologies.

Optionally, with reference to FIG. 2, the AI technology configuration method provided in this embodiment of the present disclosure may further include the following step:

S112: In a first TTI, the base station activates, in the first frequency range, measurement information corresponding to a first AI technology in the at least two AI technologies, and deactivates, in a second frequency range, the measurement information corresponding to the first AI technology.

In this embodiment of the present disclosure, it is assumed that the base station allocates the first frequency range to the first AI technology in the first TTI. That is, in the first TTI, the UE uses the first AI technology in the first frequency range for communication. In the first TTI, the base station activates, in the first frequency range, the measurement information (including a measurement object, or a measurement object and a measurement sub-object) corresponding to the first AI technology, and deactivates, in the second frequency range (a frequency range allocated by the base station to the first AI technology before the first TTI), the measurement information corresponding to the first AI technology. It is assumed that the base station allocates the second frequency range to the first AI technology in the second TTI. That is, in the second TTI, the UE uses the first AI technology in the second frequency range for communication. In the second TTI, the base station activates, in the second frequency range, the measurement information corresponding to the first AI technology, and deactivates, in the first frequency range (a frequency range allocated by the base station to the first AI technology in a first TTI before the second TTI), the measurement information corresponding to the first AI technology. In this way, it can be ensured that the measurement performed by the UE can be flexibly adapted to changes in a frequency range and a TTI that correspond to each AI technology.

The activating, by the base station, the measurement information corresponding to the first AI technology may be specifically: activating, by the base station, a measurement object corresponding to the first AI technology or a measurement object and a measurement sub-object corresponding to the first AI technology. The deactivating, by the base station, the measurement information corresponding to the first AI technology may be specifically: deactivating, by the base station, the measurement object corresponding to the first AI technology or the measurement object and the measurement sub-object corresponding to the first AI technology.

The first frequency range and the second frequency range may be two frequency ranges in the foregoing common frequency range.

Figure 9:
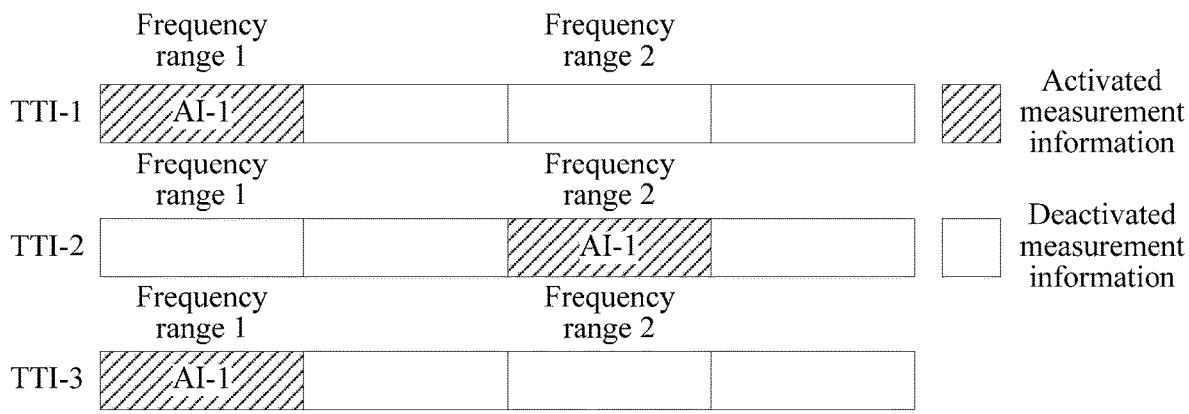
FIG. 9 is a schematic diagram of activating and deactivating measurement information corresponding to an AI technology according to an embodiment of the present disclosure.

For example, as shown in FIG. 9, FIG. 9 is a schematic diagram of activating, in a TTI, an AI technology in a frequency range and deactivating the AI technology in another frequency range (a frequency range allocated by the base station to the AI technology before the TTI) according to an embodiment of the present disclosure.

In FIG. 9, it is assumed that the AI technology is AI-1, the base station allocates a frequency range 1 to AI-1 in TTI-1, and the base station allocates a frequency range 2 to AI-1 in TTI-2. In TTI-2, the base station needs to activate measurement information corresponding to AI-1 in the frequency range 2, and deactivate the measurement information corresponding to AI-1 in the frequency range 1. It is assumed that the base station further allocates the frequency range 1 to AI-1 in TTI-3. In TTI-3, the base station needs to activate the measurement information corresponding to AI-1 in the frequency range 1, and deactivate the measurement information corresponding to AI-1 in the frequency range 2.

It should be noted that measurement performed by the UE may include RRM measurement, CSI measurement, and the like. Content described in S111 and S112 is all for the RRM measurement. In the CSI measurement, for each AI technology, the base station may configure full bandwidth measurement and sub-band measurement in a CSI measurement bandwidth range based on the AI technology. In the sub-band measurement, each sub-band is a part of a measurement bandwidth for the AI technology. A sum of a plurality of sub-bands is less than or equal to the measurement bandwidth for the AI technology.

Further, the RRM measurement may be used by the UE to perform mobility management, and the CSI measurement may be used by the base station to dynamically allocate a resource to the UE.

In the AI technology configuration method provided in this embodiment of the present disclosure, because the measurement information corresponding to the AI technologies can be activated and deactivated, it can be ensured that the measurement performed by the UE can be flexibly adapted to changes in a frequency range and a TTI that correspond to each AI technology.

The AI technology configuration method provided in this embodiment of the present disclosure may be applied to an inter-base station handover scenario, a dual connectivity scenario, or an inter-base station carrier aggregation scenario. The inter-base station handover scenario is used as an example. It is assumed that a current base station serving the UE is a base station 1. When the base station 1 determines that signal quality of the base station 1 does not satisfy a preset condition (for example, the signal quality of the base station 1 is less than a preset signal quality threshold), the base station 1 needs to configure the UE to measure signal quality of a base station (which is assumed to be a base station 2) adjacent to the base station 1. Before the base station 1 configures the UE to measure the signal quality of the base station 2, the base station 1 first needs to obtain measurement configuration information of at least two AI technologies supported by the base station 2.

For example, the AI technology configuration method provided in this embodiment of the present disclosure may further include S1 and S2.

S1: The base station 1 sends a request message to the base station 2, where the request message is used to request the measurement configuration information of the at least two AI technologies supported by the base station 2.

The measurement configuration information of the at least two AI technologies supported by the base station 2 is measurement configuration information of at least two AI technologies supported by a serving cell of the base station 2 and a neighboring cell of the base station 2 (that is, a cell adjacent to the serving cell of the base station 2). The at least two AI technologies supported by the serving cell of the base station 2 and the neighboring cell of the base station 2 may include some or all AI technologies supported by the serving cell of the base station 2 and the neighboring cell of the base station 2.

In this embodiment of the present disclosure, the request message may include identifiers of the at least two AI technologies of which the measurement configuration information needs to be obtained by the base station 1. After the base station 2 receives the request message sent by the base station 1, the base station 2 may determine, based on the identifiers carried in the request message, the at least two AI technologies of which the measurement configuration information needs to be obtained by the base station 1.

Optionally, in this embodiment of the present disclosure, the identifiers of the at least two AI technologies of which the measurement configuration information needs to be obtained by the base station 1 may be indexes of the at least two AI technologies, IDs of the at least two AI technologies, or the like. Specifically, the identifiers may be determined based on an actual use requirement. This is not limited in this embodiment of the present disclosure. It may be understood that the identifiers of the at least two AI technologies of which the measurement configuration information needs to be obtained by the base station 1 may include identifiers of the some or all AI technologies supported by the serving cell of the base station 2 and the neighboring cell of the base station 2.

Optionally, in this embodiment of the present disclosure, the request message in S1 may be carried in an X2 establishment request message for establishing an X2 interface between the base station 1 and the base station 2. That is, the base station 1 may send the request message to the base station 2 by adding the request message to the X2 establishment request message.

Optionally, in this embodiment of the present disclosure, the request message in S1 may be sent by using the X2 interface between the base station 1 and the base station 2. That is, the base station 1 may send the request message to the base station 2 by using the X2 interface between the base station 1 and the base station 2.

S2: The base station 2 sends a first response message to the base station 1, where the first response message is used to return the measurement configuration information of the at least two AI technologies supported by the base station 2.

Optionally, in this embodiment of the present disclosure, the measurement configuration information of the at least two AI technologies supported by the base station 2 may be at least one of the following: frequency segments corresponding to the at least two AI technologies supported by the serving cell of the base station 2 and the neighboring cell of the base station 2, offsets between the frequency segments corresponding to the at least two AI technologies and a center frequency segment, measurement bandwidths for the at least two AI technologies, upper and lower borders of measurement regions for the at least two AI technologies, locations of measurement signals corresponding to the at least two AI technologies, measurement moments corresponding to at least two AI technologies, and the like.

The measurement moment may be any time unit that can be used for measurement, such as a subframe, a symbol, a timeslot (slot), or a mini-slot. Specifically, the time unit may be determined based on an actual use requirement. This is not limited in this embodiment of the present disclosure.

Optionally, in this embodiment of the present disclosure, the first response message in S2 may be carried in an X2 establishment response message for establishing an X2 interface between the base station 1 and the base station 2. That is, the base station 2 may send the first response message to the base station 1 by adding the first response message to the X2 establishment response message.

Optionally, in this embodiment of the present disclosure, the first response message in S2 may be sent by using the X2 interface between the base station 1 and the base station 2. That is, the base station 2 may send the first response message to the base station 1 by using the X2 interface between the base station 1 and the base station 2.

Optionally, in this embodiment of the present disclosure, the base station 2 may also need to configure the UE to measure the signal quality of the base station 1. For example, a possible implementation is that S1 may be replaced with the following S10:

S10: The base station 1 sends, to the base station 2, a request message and measurement configuration information of at least two AI technologies supported by the base station 1.

The measurement configuration information of the at least two AI technologies supported by the base station 1 may be at least one of the following: frequency segments corresponding to the at least two AI technologies supported by a serving cell of the base station 1 and a neighboring cell of the base station 1, offsets between the frequency segments corresponding to the at least two AI technologies and a center frequency segment, measurement bandwidths for the at least two AI technologies, upper and lower borders of measurement regions for the at least two AI technologies, locations of measurement signals corresponding to the at least two AI technologies, and measurement moments corresponding to at least two AI technologies.

For descriptions of the measurement moment, refer to related descriptions of the measurement moment in the measurement configuration information of the at least two AI technologies supported by the base station 2, and details are not described herein again.

For descriptions of the request message sent by the base station 1 to the base station 2, refer to related descriptions of the request message sent by the base station 1 to the base station 2 in S1. For other descriptions of the measurement configuration information of the at least two AI technologies supported by the base station 1, refer to related descriptions of the measurement configuration information of the at least two AI technologies supported by the base station 2 in S1. Details are not described herein again.

Optionally, in this embodiment of the present disclosure, the base station 2 may also need to configure the UE to measure the signal quality of the base station 1. For example, another possible implementation is that S1 may be replaced with the following S11, and S2 may be replaced with the following S21:

S11: The base station 1 sends, to the base station 2, measurement configuration information of at least two AI technologies supported by the base station 1.

S21: The base station 2 sends a second response message to the base station 1, where the second response message is used to confirm that the base station 2 has successfully received the measurement configuration information of the at least two AI technologies supported by the base station 1.

For descriptions of the measurement configuration information of the at least two AI technologies supported by the base station 1, refer to related descriptions of the measurement configuration information of the at least two AI technologies supported by the base station 2 in S1 and related descriptions of the measurement configuration information of the at least two AI technologies supported by the base station 1 in S10, and details are not described herein again.

It should be noted that in this embodiment of the present disclosure, S21 may not be performed. In other words, after the base station 1 performs S11, if the base station 1 does not receive, in a period of time (for example, a preset period of time), the second response message sent by the base station 2, the base station 1 may alternatively consider that the base station 2 has successfully received the measurement configuration information of the at least two AI technologies supported by the base station 1.

Optionally, when the measurement configuration information of the at least two AI technologies supported by the base station 2 changes, the AI technology configuration method provided in this embodiment of the present disclosure may further include the following step:

S3: The base station 2 sends a first configuration modification message to the base station 1, where the first configuration modification message is used to indicate that the measurement configuration information of the at least two AI technologies supported by the base station 2 changes.

Optionally, in this embodiment of the present disclosure, for the changed measurement configuration information of the at least two AI technologies supported by the base station 2, refer to related descriptions of the measurement configuration information of the at least two AI technologies supported by the base station 2 in S2, and details are not described herein again.

In this embodiment of the present disclosure, the first configuration modification message in S3 may be carried in a base station configuration update message. That is, the base station 2 may send the first configuration modification message to the base station 1 by adding the first configuration modification message to the base station configuration update message.

It may be understood that in this embodiment of the present disclosure, when the measurement configuration information of the at least two AI technologies supported by the base station 1 changes, the base station 1 may alternatively send a second configuration modification message to the base station 2. The second configuration modification message is used to indicate that the measurement configuration information of the at least two AI technologies supported by the base station 1 changes.

For descriptions of the second configuration modification message, refer to related descriptions of the first configuration modification message in S3, and details are not described herein again.

Optionally, with reference to FIG. 2, the AI technology configuration method provided in this embodiment of the present disclosure may further include the following step:

S113: The base station configures a same physical uplink control channel (PUCCH) for each of the at least two AI technologies.

In this embodiment, the base station configures a same PUCCH for each AI technology. That is, the base station configures a common PUCCH on the carrier. The common PUCCH is used to send a hybrid automatic repeat request (HARQ) feedback, a scheduling request, a CSI feedback, and the like corresponding to each AI technology. In this embodiment, because only one common PUCCH is used on one carrier, a power peak of an uplink signal is relatively low. However, because units of measurement used for the AI technologies are different, a case in which different units of measurement are used for different AI technologies needs to be dealt with. For example, a TTI used for AI-1 is 1 millisecond, and a TTI used for AI-2 is 0.1 millisecond. When the common PUCCH supports a 1 millisecond TTI or a 0.1 millisecond TTI, corresponding special processing needs to be performed on the AI technologies for which different TTIs are used, so as to be adapted to the TTI supported by the common PUCCH.

Figure 10:
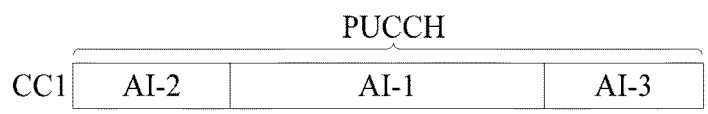
FIG. 10 is a first schematic diagram of configuring a PUCCH for an AI technology by a base station according to an embodiment of the present disclosure.

For example, as shown in FIG. 10, the base station configures a same PUCCH for AI-1, AI-2, and AI-3 on a carrier (for example, a carrier 1 or CC1).

Alternatively, S113 may be replaced with the following step:

S113a: The base station configures a different PUCCH for each of the at least two AI technologies.

For descriptions of the PUCCH, refer to related descriptions of the PUCCH in S113, and details are not described herein again.

Figure 11:
FIG. 11 is a second schematic diagram of configuring a PUCCH for an AI technology by a base station according to an embodiment of the present disclosure.

In this embodiment, compared with S113, in S113a, the base station configures a different PUCCH for each AI technology, so as to avoid a problem that different units of measurement are used for different AI technologies, thereby reducing implementation complexity. For example, as shown in FIG. 11, the base station configures different PUCCHs for AI-1, AI-2, and AI-3 on a carrier (for example, a carrier 1 or CC1). For example, the base station configures a PUCCH 1 for AI-1, a PUCCH 2 for AI-2, and a PUCCH 3 for AI-3.

Alternatively, S113 may be replaced with the following step:

S113b: The base station configures different PUCCHs for some of the at least two AI technologies, and configures, for other AI technologies than the some of the at least two AI technologies, a PUCCH the same as that for at least one of the some AI technologies.

For descriptions of the PUCCH, refer to related descriptions of the PUCCH in S113, and details are not described herein again.

In this embodiment, the base station configures different PUCCHs for some AI technologies, and configures, for other AI technologies, a PUCCH the same as that for at least one of the some AI technologies. For AI technologies that are configured with a same PUCCH, not only a problem that different units of measurement are used for the AI technologies can be avoided, but also a power peak of an uplink signal is relatively low. In addition, compared with S113a, in this embodiment, a total quantity of PUCCHs can be reduced.

Figure 12:
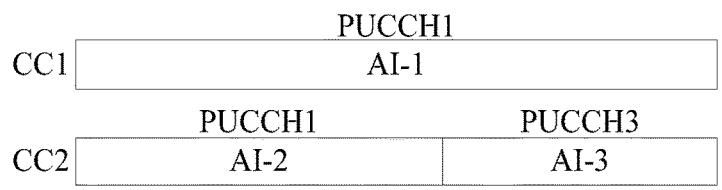
FIG. 12 is a third schematic diagram of configuring a PUCCH for an AI technology by a base station according to an embodiment of the present disclosure.

For example, as shown in FIG. 12, the base station configures a same PUCCH for AI-1 on one carrier (for example, a carrier 1 or CC1) and AI-2 on another carrier (for example, a carrier 2 or CC2), and configures, for AI-3 on the another carrier (for example, the carrier 2 or CC2), a PUCCH different from the PUCCH configured for AI-1 and AI-2. For example, the base station configures a PUCCH 1 for AI-1 and AI-2, and configures a PUCCH 3 for AI-3.

It should be noted that FIG. 12 is described by only using an example in which AI-1 is located on one carrier and AI-2 and AI-3 are located on another carrier. In an actual application, alternatively, there may further be more AI technologies, and the plurality of AI technologies may be located on one carrier or on different carriers. Whether the plurality of AI technologies are located on one carrier or on different carriers may be specifically set based on an actual use requirement. This is not limited in this embodiment of the present disclosure.

Further, the AI technologies on the foregoing two carriers may be the same or be different. Alternatively, some of the AI technologies may be the same. This is not specifically limited in this embodiment of the present disclosure.

Optionally, when the base station configures a plurality of PUCCHs, if the UE sends the plurality of PUCCHs and a physical uplink shared channel (PUSCH) simultaneously, the UE may obtain power headroom (PH) information of the UE by using a maximum transmit power of the UE or a maximum transmit power of a cell in which the UE is located minus a sum of powers of the plurality of PUCCHs and a power of the PUSCH, and send the PH information to the base station by adding the PH information to a power headroom report (PHR).

Specifically, the UE may add, to the power headroom report, PH information corresponding to each AI technology, or PH information corresponding to an AI technology that is in an activated state, or PH information corresponding to an AI technology having a highest priority.

In the method in which the base station configures PUCCHs for the plurality of AI technologies provided in this embodiment, HARQ feedback, a scheduling request, CSI feedback, power control, and the like can be supported in the case of the plurality of AI technologies. Therefore, resources can be allocated more flexibly, thereby improving resource utilization.

Optionally, with reference to FIG. 2, the AI technology configuration method provided in this embodiment of the present disclosure may further include the following step:

S114: The base station configures different PDCCHs/EPDCCHs for some of the at least two AI technologies, and configures, for other AI technologies than the some of the at least two AI technologies, a PDCCH/an EPDCCH the same as that for at least one of the some AI technologies.

The other AI technologies and the at least one AI technology correspond to different carriers.

It should be noted that the method used by the base station to configure the PDCCH/EPDCCH in S114 is similar to the method used by the base station to configure the PUCCH in S113b. For specific descriptions, refer to related descriptions of the method used by the base station to configure the PUCCH in S113b, and details are not described herein again.

Figure 13:
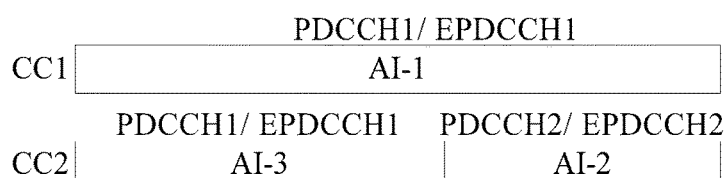
FIG. 13 is a schematic diagram of configuring a PDCCH/an EPDCCH for an AI technology by a base station according to an embodiment of the present disclosure.

For example, as shown in FIG. 13, the base station configures a same PDCCH/EPDCCH for AI-1 on one carrier (for example, a carrier 1 or CC1) and AI-3 on another carrier (for example, a carrier 2 or CC2), and configures, for AI-2 on the another carrier (for example, the carrier 2 or CC2), a PDCCH/an EPDCCH different from the PDCCH/EPDCCH configured for AI-1 and AI-3. For example, the base station configures a PDCCH 1/an EPDCCH 1 for AI-1 and AI-3, and configures a PDCCH 2/an EPDCCH 2 for AI-3.

It should be noted that FIG. 13 is described by only using an example in which AI-1 is located on one carrier and AI-2 and AI-3 are located on another carrier. In an actual application, alternatively, there may further be a plurality of AI technologies, and the plurality of AI technologies may be located on one carrier or on different carriers. Whether the plurality of AI technologies are located on one carrier or on different carriers may be specifically set based on an actual use requirement. This is not limited in this embodiment of the present disclosure.

Further, the AI technologies on the foregoing two carriers may be the same or be different. Alternatively, some of the AI technologies may be the same. This is not specifically limited in this embodiment of the present disclosure.

In the method in which the base station configures PDCCHs/EPDCCHs for the plurality of AI technologies provided in this embodiment, a same PDCCH/EPDCCH may be configured for different AIs on a same carrier or on different carriers. Therefore, resources can be allocated more flexibly, thereby improving resource utilization.

Figure 14:
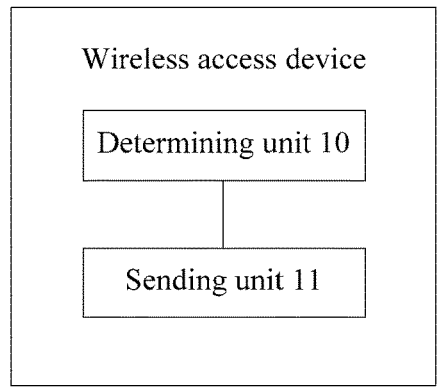
FIG. 14 is a first schematic structural diagram of a wireless access device according to an embodiment of the present disclosure.

As shown in FIG. 14, an embodiment of the present disclosure provides a wireless access device. The wireless access device is configured to perform the steps performed by the wireless access device in the foregoing method. The wireless access device may include modules corresponding to corresponding steps. For example, the wireless access device may include:

a determining unit 10, configured to determine at least two AI technologies that need to be configured on a same carrier and configuration information of the at least two AI technologies; and a sending unit 11, configured to send the configuration information that is of the at least two AI technologies and that is determined by the determining unit 10 to a UE, where the configuration information of the at least two AI technologies is used by the UE to configure the at least two AI technologies on the same carrier.

Optionally, the configuration information of the at least two AI technologies includes a first particular frequency range and a common frequency range, the first particular frequency range includes a first frequency subrange that corresponds to the at least two AI technologies and that is pre-configured by the wireless access device, the first frequency subrange is used to transmit control information corresponding to the at least two AI technologies, and the common frequency range is used by the wireless access device to allocate, based on a resource requirement of the UE, resources corresponding to the at least two AI technologies.

Optionally, the configuration information of the at least two AI technologies further includes a second particular frequency range, the second particular frequency range includes a second frequency subrange that corresponds to each of the at least two AI technologies and that is preconfigured by the wireless access device, and the second frequency subrange is used by the wireless access device to allocate, based on the resource requirement of the UE, a resource corresponding to the AI technology.

Optionally, the configuration information of the at least two AI technologies includes configuration information of a Media Access Control MAC function unit, the MAC function unit includes at least one of a common MAC function unit and at least one particular MAC function unit, the common MAC function unit corresponds to the at least one particular MAC function unit or the common MAC function unit corresponds to the at least two AI technologies, and the at least one particular MAC function unit corresponds to the at least two AI technologies.

Figure 15:
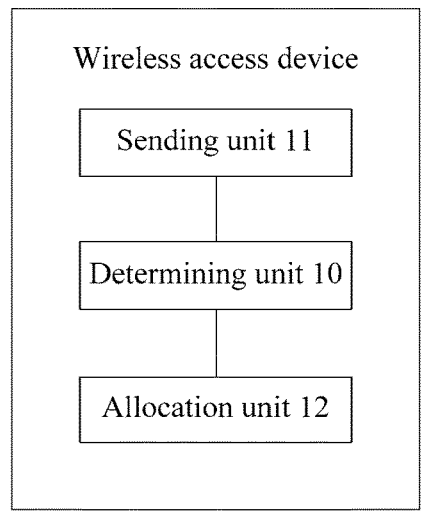
FIG. 15 is a second schematic structural diagram of a wireless access device according to an embodiment of the present disclosure.

Optionally, with reference to FIG. 14, as shown in FIG. 15, the wireless access device may further include an allocation unit 12.

The allocation unit 12 is configured to allocate, to the UE after the sending unit 11 sends the configuration information of the at least two AI technologies to the UE, resources corresponding to the at least two AI technologies on the same carrier.

The determining unit 10 is further configured to determine a resource location of resource allocation information based on a preset subcarrier spacing and a transmission time interval TTI length corresponding to each of the at least two AI technologies. The resource allocation information is used to indicate a resource that corresponds to the AI technology and that is allocated by the allocation unit 12.

The sending unit 11 is further configured to send the resource allocation information to the UE based on the resource location determined by the determining unit 10.

Optionally, with reference to FIG. 14, as shown in FIG. 15, the wireless access device may further include an allocation unit 12.

The allocation unit 12 is configured to allocate, to the UE after the sending unit 11 sends the configuration information of the at least two AI technologies to the UE, resources corresponding to the at least two AI technologies on the same carrier.

The determining unit 10 is further configured to determine a resource location of resource allocation information based on a subcarrier spacing for each of the at least two AI technologies and a TTI length for the AI technology. The resource allocation information is used to indicate a resource that corresponds to the AI technology and that is allocated by the allocation unit 12.

The sending unit 11 is further configured to send the resource allocation information to the UE based on the resource location determined by the determining unit 10.

Optionally, with reference to FIG. 14, as shown in FIG. 15, the wireless access device may further include an allocation unit 12.

The allocation unit 12 is configured to allocate, to the UE after the sending unit 11 sends the configuration information of the at least two AI technologies to the UE, resources corresponding to the at least two AI technologies on the same carrier.

The determining unit 10 is further configured to determine, in a first frequency subrange corresponding to each of the at least two AI technologies, a resource location of resource allocation information based on a subcarrier spacing for the AI technology and a TTI length for the AI technology. The resource allocation information is used to indicate a resource that corresponds to the AI technology and that is allocated by the allocation unit 12.

The sending unit 11 is further configured to send the resource allocation information to the UE based on the resource location determined by the determining unit 10.

Optionally, the sending unit 11 is further configured to send, to the UE, measurement information corresponding to the at least two AI technologies. The measurement information is used to instruct the UE to perform measurement.

Optionally, the measurement information includes a measurement object, and the measurement object is a first frequency range corresponding to each AI technology. Alternatively, the measurement information includes a measurement object and a measurement sub-object, the measurement object is a carrier corresponding to each AI technology, and the measurement sub-object is a first frequency range corresponding to each AI technology.

Optionally, the measurement information further includes at least one piece of subframe configuration information, and the at least one piece of subframe configuration information is used to instruct the UE to perform measurement on a subframe indicated by the at least one piece of subframe configuration information.

Figure 16:
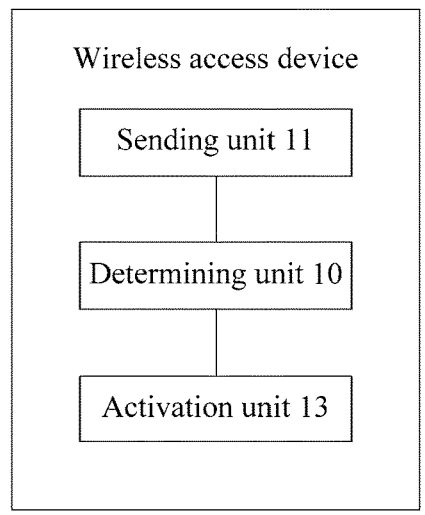
FIG. 16 is a third schematic structural diagram of a wireless access device according to an embodiment of the present disclosure.

Optionally, with reference to FIG. 14, as shown in FIG. 16, the wireless access device may further include an activation unit 13.

The activation unit 13 is configured to: in a first TTI, activate, in the first frequency range, measurement information corresponding to a first AI technology in the at least two AI technologies determined by the determining unit 10, and deactivate, in a second frequency range, the measurement information corresponding to the first AI technology.

Figure 17:
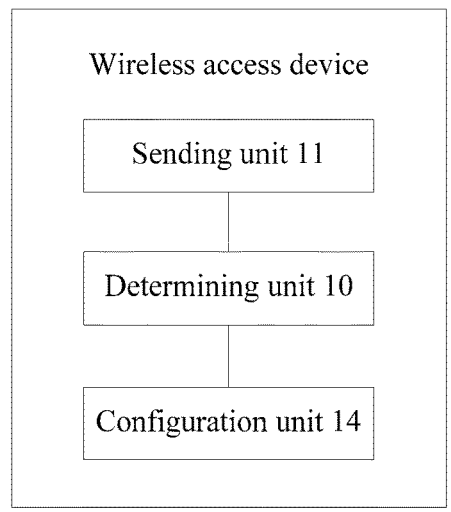
FIG. 17 is a fourth schematic structural diagram of a wireless access device according to an embodiment of the present disclosure.

Optionally, with reference to FIG. 14, as shown in FIG. 17, the wireless access device may further include a configuration unit 14.

The configuration unit 14 is configured to configure a same PUCCH for each of the at least two AI technologies determined by the determining unit 10; or the configuration unit 14 is configured to configure a different PUCCH for each of the at least two AI technologies determined by the determining unit 10; or the configuration unit 14 is configured to: configure different PUCCHs for some of the at least two AI technologies determined by the determining unit 10, and configure, for other AI technologies than the some of the at least two AI technologies, a PUCCH the same as that for at least one of the some AI technologies.

Optionally, with reference to FIG. 14, as shown in FIG. 17, the wireless access device may further include a configuration unit 14.

The configuration unit 14 is configured to: configure different PDCCHs/EPDCCHs for some of the at least two AI technologies determined by the determining unit 10, and configure, for other AI technologies than the some of the at least two AI technologies, a PDCCH/an EPDCCH the same as that for at least one of the some AI technologies. The other AI technologies and the at least one AI technology correspond to different carriers.

It may be understood that the wireless access device in this embodiment may correspond to the wireless access device in the AI technology configuration method shown in FIG. 2 or FIG. 8, and division and/or functions of the modules in the wireless access device in this embodiment are all intended to implement the method procedure shown in FIG. 2 or FIG. 8. To avoid repetition, details are not further described herein again.

This embodiment of the present disclosure provides the wireless access device. The wireless access device may determine the at least two AI technologies that need to be configured on the same carrier and the configuration information of the at least two AI technologies, and the wireless access device may send the configuration information of the at least two AI technologies to the UE, so that the UE configures the at least two AI technologies on the same carrier. Therefore, the wireless access device provided in this embodiment of the present disclosure can be supported in configuring a plurality of AI technologies on a same carrier for the UE, so as to use the plurality of AI technologies more flexibly, and to be better adapted to application scenarios in which the plurality of AI technologies need to be used in a wireless communications system, thereby improving utilization and use flexibility of resources on the same carrier.

Figure 18:
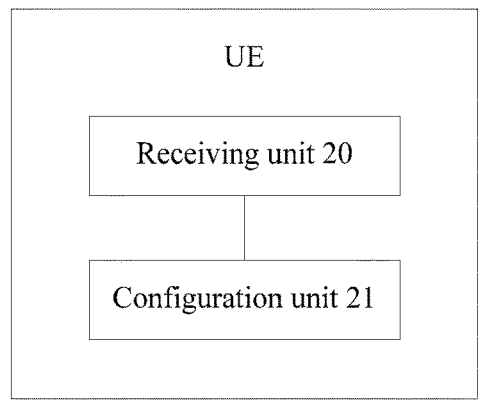
FIG. 18 is a first schematic structural diagram of a UE according to an embodiment of the present disclosure.

As shown in FIG. 18, an embodiment of the present disclosure provides UE. The UE is configured to perform the steps performed by the UE in the foregoing method. The UE may include modules corresponding to corresponding steps. For example, the UE may include: a receiving unit 20, configured to receive configuration information that is of at least two AI technologies on a same carrier and that is sent by a wireless access device; and a configuration unit 21, configured to configure the at least two AI technologies on the same carrier based on the configuration information that is of the at least two AI technologies and that is received by the receiving unit 20.

Figure 19:
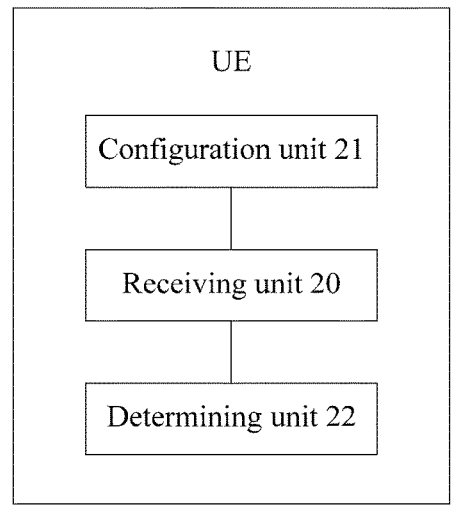
FIG. 19 is a second schematic structural diagram of a UE according to an embodiment of the present disclosure.

Optionally, with reference to FIG. 18, as shown in FIG. 19, the UE may further include a determining unit 22.

The determining unit 22 is configured to: after the configuration unit 21 configures the at least two AI technologies on the same carrier based on the configuration information of the at least two AI technologies, determine a resource location of resource allocation information based on a preset subcarrier spacing and a transmission time interval TTI length corresponding to each of the at least two AI technologies. The resource allocation information is used to indicate a resource corresponding to the AI technology. The receiving unit 20 is further configured to receive, based on the resource location determined by the determining unit 22, the resource allocation information sent by the wireless access device.

Optionally, with reference to FIG. 18, as shown in FIG. 19, the UE may further include a determining unit 22.

The determining unit 22 is configured to: after the configuration unit 21 configures the at least two AI technologies on the same carrier based on the configuration information of the at least two AI technologies, determine a resource location of resource allocation information based on a subcarrier spacing for each AI technology and a TTI length for the AI technology. The resource allocation information is used to indicate a resource corresponding to the AI technology. The receiving unit 20 is further configured to receive, based on the resource location determined by the determining unit 22, the resource allocation information sent by the wireless access device.

Optionally, with reference to FIG. 18, as shown in FIG. 19, the UE may further include a determining unit 22.

The determining unit 22 is configured to: after the configuration unit 21 configures the at least two AI technologies on the same carrier based on the configuration information of the at least two AI technologies, determine, in a first particular frequency range corresponding to each of the at least two AI technologies, a resource location of resource allocation information based on a subcarrier spacing for the AI technology and a TTI length for the AI technology. The resource allocation information is used to indicate a resource corresponding to the AI technology. The receiving unit 20 is further configured to receive, based on the resource location determined by the determining unit 22, the resource allocation information sent by the wireless access device.

It may be understood that the UE in this embodiment may correspond to the UE in the AI technology configuration method shown in FIG. 2 or FIG. 8, and division and/or functions of the modules in the UE in this embodiment are all intended to implement the method procedure shown in FIG. 2 or FIG. 8. To avoid repetition, details are not further described herein again.

This embodiment of the present disclosure provides the UE. The UE may receive the configuration information, sent by the base station, of the at least two AI technologies that need to be configured on the same carrier, and the UE may configure the at least two AI technologies on the same carrier based on the configuration information of the at least two AI technologies. Therefore, the UE provided in this embodiment of the present disclosure can be supported in configuring a plurality of AI technologies on a same carrier, so as to use the plurality of AI technologies more flexibly, and to be better adapted to application scenarios in which the plurality of AI technologies need to be used in a wireless communications system, thereby improving utilization and use flexibility of resources on the same carrier.

Figure 20:
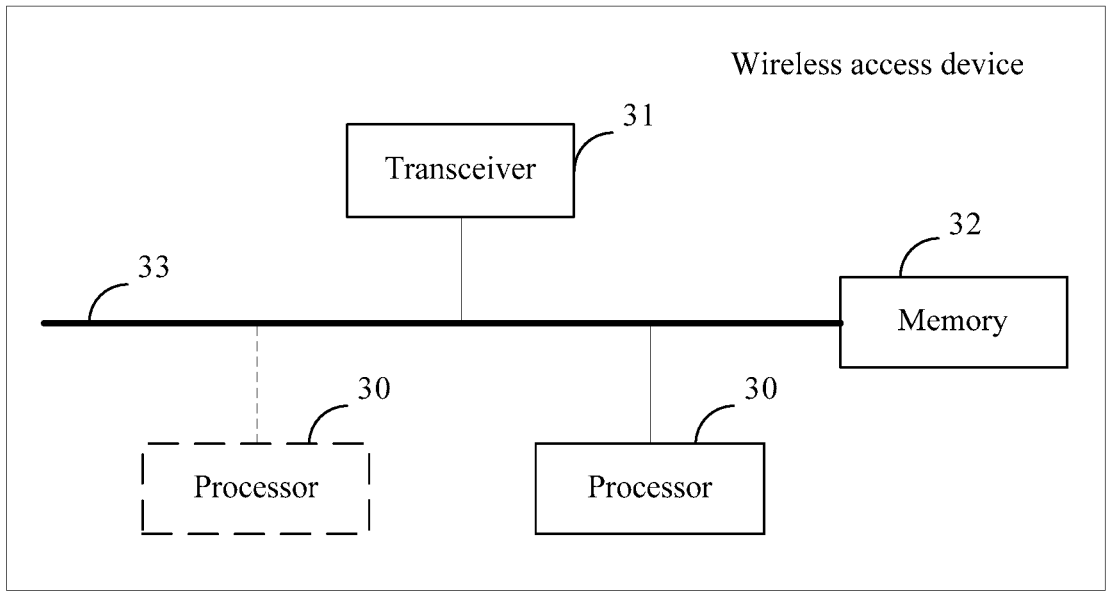
FIG. 20 is a schematic hardware diagram of a wireless access device according to an embodiment of the present disclosure.

As shown in FIG. 20, an embodiment of the present disclosure provides a wireless access device. The wireless access device includes at least one processor 30, a transceiver 31, a memory 32, and a system bus 33.

The memory 32 is configured to store a computer executable instruction. The at least one processor 30, the memory 32, and the transceiver 31 are connected and communicate with each other by using the system bus 33. When the wireless access device operates, the at least one processor 30 executes the computer executable instruction stored in the memory 32, so that the wireless access device performs the AI technology configuration method shown in FIG. 2 or FIG. 8. For a specific AI technology configuration method, refer to the related descriptions in the embodiment of FIG. 2 or FIG. 8, and details are not described herein again.

This embodiment further provides a storage medium. The storage medium may include the memory 32.

The at least one processor 30 may be a central processing unit (CPU). The at least one processor 30 may alternatively be another general-purpose processor, a digital signal processor (DSP), an application-specific integrated circuit (ASIC), a field programmable gate array (FPGA) or another programmable logic device, a discrete gate or a transistor logic device, a discrete hardware component, or the like. The general-purpose processor may be a microprocessor or the processor may be any conventional processor or the like.

The at least one processor 30 may be a special-purpose processor. The special-purpose processor may include at least one of a baseband processor chip, a radio frequency processing chip, and the like. Further, the special-purpose processor may further include a chip having another special processing function of the wireless access device.

The memory 32 may include a volatile memory, for example, a random access memory (RAM). The memory 32 may alternatively include a non-volatile memory, for example, a read-only memory (ROM), a flash memory, a hard disk drive (HDD), or a solid-state drive (SSD). The memory 32 may alternatively include a combination of the foregoing memories.

The system bus 33 may include a data bus, a power bus, a control bus, a signal status bus, and the like. In this embodiment, for the purpose of clear description, all buses are marked as the system bus 33 in FIG. 20.

The transceiver 31 may be specifically a transceiver in the wireless access device. The transceiver may be a radio transceiver. For example, the radio transceiver may be an antenna of the wireless access device or the like. The at least one processor 30 sends data to or receives data from another device such as a UE, by using the transceiver 31.

In a specific implementation process, the steps in the method procedure shown in FIG. 2 or FIG. 8 may be performed by the processor 30 in hardware form by executing the computer executable instruction stored in software form in the memory 32. To avoid repetition, details are not described herein again.

Optionally, an embodiment of the present disclosure further provides a computer-readable storage medium. The computer-readable storage medium stores one or more programs. The one or more programs include an instruction. When at least one processor of a wireless access device executes the instruction, the wireless access device performs the AI technology configuration method shown in FIG. 2 or FIG. 8. For a specific AI technology configuration method, refer to the related descriptions in the embodiment of FIG. 2 or FIG. 8, and details are not described herein again.

This embodiment of the present disclosure provides the wireless access device. The wireless access device may determine the at least two AI technologies that need to be configured on the same carrier and the configuration information of the at least two AI technologies, and the wireless access device may send the configuration information of the at least two AI technologies to the UE, so that the UE configures the at least two AI technologies on the same carrier. Therefore, the wireless access device provided in this embodiment of the present disclosure can be supported in configuring a plurality of AI technologies on a same carrier for the UE, so as to use the plurality of AI technologies more flexibly, and to be better adapted to application scenarios in which the plurality of AI technologies need to be used in a wireless communications system, thereby improving utilization and use flexibility of resources on the same carrier.

Figure 21:
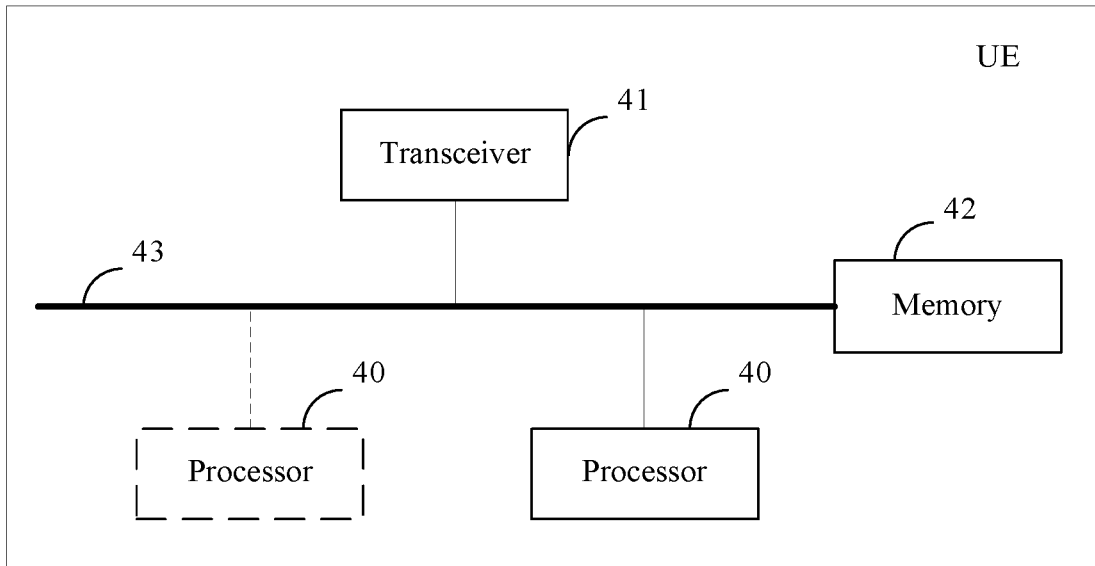
FIG. 21 is a schematic hardware diagram of a UE according to an embodiment of the present disclosure.

As shown in FIG. 21, an embodiment of the present disclosure provides UE. The UE includes at least one processor 40, a transceiver 41, a memory 42, and a system bus 43.

The memory 42 is configured to store a computer executable instruction. The at least one processor 40, the memory 42, and the transceiver 41 are connected and communicate with each other by using the system bus 43. When the UE operates, the at least one processor 40 executes the computer executable instruction stored in the memory 42, so that the UE performs the AI technology configuration method shown in FIG. 2 or FIG. 8. For a specific AI technology configuration method, refer to the related descriptions in the embodiment of FIG. 2 or FIG. 8, and details are not described herein again.

This embodiment further provides a storage medium. The storage medium may include the memory 42.

The at least one processor 40 may be a CPU, or the at least one processor 40 may be another general-purpose processor, a DSP, an ASIC, an FPGA or another programmable logic device, a discrete gate or a transistor logic device, a discrete hardware component, or the like. The general-purpose processor may be a microprocessor or the processor may be any conventional processor or the like.

The at least one processor 40 may be a special-purpose processor. The special-purpose processor may include at least one of a baseband processor chip, a radio frequency processing chip, and the like. Further, the special-purpose processor may further include a chip having another special processing function of the UE.

The memory 42 may include a volatile memory, for example, a RAM. The memory 42 may alternatively include a non-volatile memory, for example, a ROM, a flash memory, an HDD, or an SSD. The memory 42 may alternatively include a combination of the foregoing memories.

The system bus 43 may include a data bus, a power bus, a control bus, a signal status bus, and the like. In this embodiment, for the purpose of clear description, all buses are marked as the system bus 43 in FIG. 21.

The transceiver 41 may be specifically a transceiver in the UE. The transceiver may be a radio transceiver. For example, the radio transceiver may be an antenna of the UE or the like. The at least one processor 40 sends data to or receives data from another device such as a wireless access device, by using the transceiver 41.

In a specific implementation process, the steps in the method procedure shown in FIG. 2 or FIG. 8 may be performed by the processor 40 in hardware form by executing the computer executable instruction stored in software form in the memory 42. To avoid repetition, details are not described herein again.

Optionally, an embodiment of the present disclosure further provides a computer-readable storage medium. The computer-readable storage medium stores one or more programs. The one or more programs include an instruction. When at least one processor of a UE executes the instruction, the UE performs the AI technology configuration method shown in FIG. 2 or FIG. 8. For a specific AI technology configuration method, refer to the related descriptions in the embodiment of FIG. 2 or FIG. 8, and details are not described herein again.

This embodiment of the present disclosure provides the UE. The UE may receive the configuration information, sent by the base station, of the at least two AI technologies that need to be configured on the same carrier, and the UE may configure the at least two AI technologies on the same carrier based on the configuration information of the at least two AI technologies. Therefore, the UE provided in this embodiment of the present disclosure can be supported in configuring a plurality of AI technologies on a same carrier, so as to use the plurality of AI technologies more flexibly, and to be better adapted to application scenarios in which the plurality of AI technologies need to be used in a wireless communications system, thereby improving utilization and use flexibility of resources on the same carrier.

Figure 22:
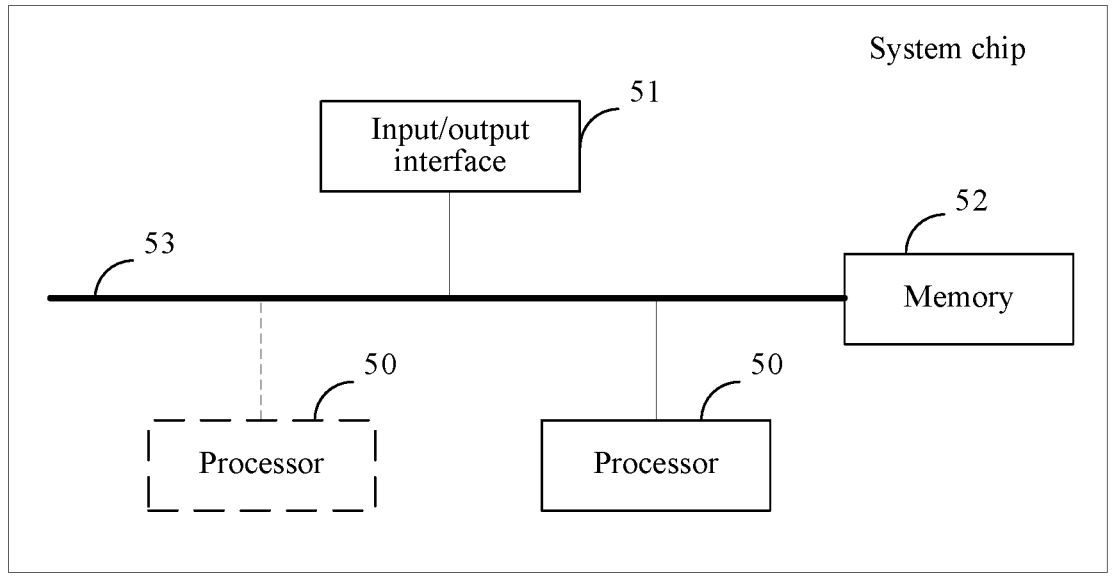
FIG. 22 is a first schematic hardware diagram of a system chip according to an embodiment of the present disclosure.

As shown in FIG. 22, an embodiment of the present disclosure provides a system chip. The system chip includes at least one processor 50, an input/output interface 51, a memory 52, and a bus 53.

The memory 52 is configured to store a computer executable instruction. The at least one processor 50, the memory 52, and the input/output interface 51 are connected and communicate with each other by using the bus 53. When the system chip operates, the at least one processor 50 executes the computer executable instruction stored in the memory 52, so that the system chip performs the AI technology configuration method shown in FIG. 2 or FIG. 8. For a specific AI technology configuration method, refer to the related descriptions in the embodiment of FIG. 2 or FIG. 8, and details are not described herein again.

It should be noted that the system chip provided in this embodiment of the present disclosure may be an SOC, or may be another chip that can perform the AI technology configuration method according to the embodiments of the present disclosure. This is not limited in this embodiment of the present disclosure.

Further, the system chip shown in FIG. 22 may be a system chip in the wireless access device shown in FIG. 20.

This embodiment of the present disclosure provides the system chip. The system chip may determine the at least two AI technologies that need to be configured on the same carrier and the configuration information of the at least two AI technologies, and the system chip may send the configuration information of the at least two AI technologies to the UE, so that the UE configures the at least two AI technologies on the same carrier. Therefore, the system chip provided in this embodiment of the present disclosure can be supported in configuring a plurality of AI technologies on a same carrier for the UE, so as to use the plurality of AI technologies more flexibly, and to be better adapted to application scenarios in which the plurality of AI technologies need to be used in a wireless communications system, thereby improving utilization and use flexibility of resources on the same carrier.

Figure 23:
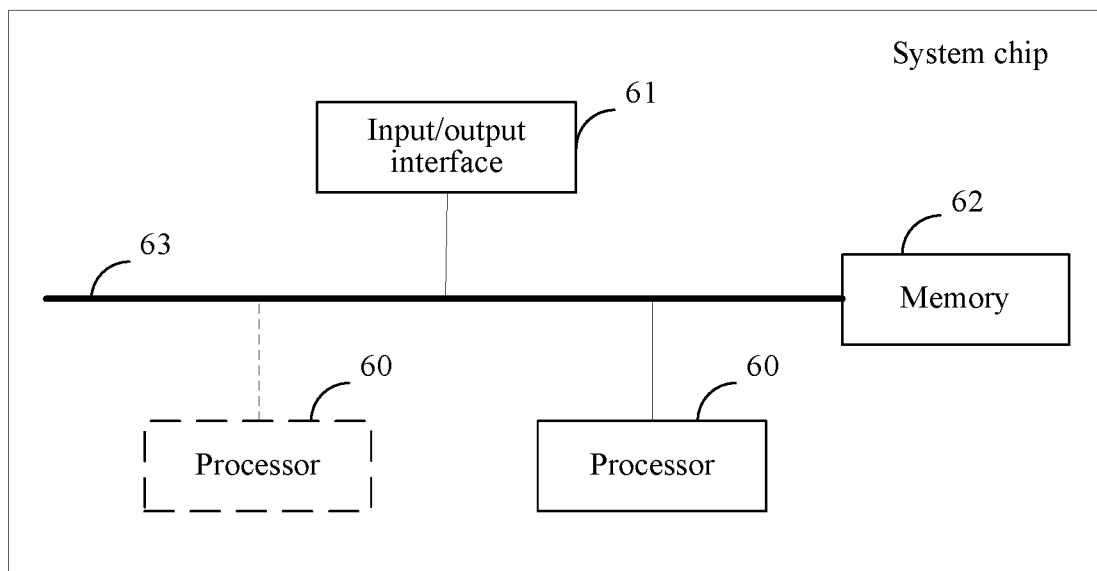
FIG. 23 is a second schematic hardware diagram of a system chip according to an embodiment of the present disclosure.

As shown in FIG. 23, an embodiment of the present disclosure provides a system chip. The system chip includes at least one processor 60, an input/output interface 61, a memory 62, and a bus 63.

The memory 62 is configured to store a computer executable instruction. The at least one processor 60, the memory 62, and the input/output interface 61 are connected and communicate with each other by using the bus 63. When the system chip operates, the at least one processor 60 executes the computer executable instruction stored in the memory 62, so that the system chip performs the AI technology configuration method shown in FIG. 2 or FIG. 8. For a specific AI technology configuration method, refer to the related descriptions in the embodiment of FIG. 2 or FIG. 8, and details are not described herein again.

It should be noted that the system chip provided in this embodiment of the present disclosure may be an SOC, or may be another chip that can perform the AI technology configuration method according to the embodiments of the present disclosure. This is not limited in this embodiment of the present disclosure.

Further, the system chip shown in FIG. 23 may be a system chip in the UE shown in FIG. 21.

This embodiment of the present disclosure provides the system chip. The system chip may receive the configuration information, sent by the base station, of the at least two AI technologies that need to be configured on the same carrier, and the system chip may configure the at least two AI technologies on the same carrier based on the configuration information of the at least two AI technologies. Therefore, the system chip provided in this embodiment of the present disclosure can support a plurality of AI technologies configured on a same carrier, so as to use the plurality of AI technologies more flexibly, and to be better adapted to application scenarios in which the plurality of AI technologies need to be used in a wireless communications system, thereby improving utilization and use flexibility of resources on the same carrier.

An embodiment of the present disclosure provides a wireless communications system. The wireless communications system includes a wireless access device and a UE. For example, as shown in FIG. 1, FIG. 1 is a schematic architectural diagram of the wireless communications system according to this embodiment of the present disclosure. The wireless access device and the UE may perform the procedure of the AI technology configuration method shown in FIG. 2 or FIG. 8. Specifically, for descriptions of the wireless access device, specifically refer to related descriptions of the wireless access device in the embodiment of any one of FIG. 14 to FIG. 17, and details are not described herein again. For descriptions of the UE, specifically refer to related descriptions of the UE in the embodiment of FIG. 18 or FIG. 19, and details are not described herein again.

Optionally, an embodiment of the present disclosure further provides a wireless communications system. The wireless communications system may include a wireless access device. Specifically, for descriptions of the wireless access device, specifically refer to related descriptions of the wireless access device in the embodiment of any one of FIG. 14 to FIG. 17, and details are not described herein again.

The embodiments of the present disclosure provide the wireless communications system. The wireless communications system may include the wireless access device and the UE, or the wireless communications system may include the wireless access device. The wireless access device may determine the at least two AI technologies that need to be configured on the same carrier and the configuration information of the at least two AI technologies, and the wireless access device may send the configuration information of the at least two AI technologies to the UE, so that the UE configures the at least two AI technologies on the same carrier. Therefore, by using the wireless communications system provided in the embodiments of the present disclosure, the wireless access device can be supported in configuring a plurality of AI technologies on a same carrier for the UE, so as to use the plurality of AI technologies more flexibly, and to be better adapted to application scenarios in which the plurality of AI technologies need to be used in the wireless communications system, thereby improving utilization and use flexibility of resources on the same carrier.

It may be clearly understood by a person skilled in the art that, for the purpose of convenient and brief description, division of the foregoing function modules is taken as an example for illustration. In actual application, the foregoing functions can be allocated to different function modules and implemented based on a requirement, that is, an inner structure of an apparatus is divided into different function modules to implement all or some of the functions described above. For a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the module or unit division is merely logical function division and may be other division in actual implementation. For example, a plurality of units or components may be combined or may be integrated into another system, or some features may be ignored or not performed. In addition, the displayed or discussed mutual couplings or direct couplings or communication connections may be implemented through some interfaces or through indirect coupling or communications connection between apparatuses or units.

The units described as separate parts may or may not be physically separate, and parts displayed as units may or may not be physical units, may be located in one position, or may be distributed on a plurality of network units. Some or all of the units may be selected based on actual requirements, to achieve the objectives of the solutions of the embodiments.

In addition, functional units in the embodiments of the present disclosure may be integrated into one processing unit, or each of the units may exist alone physically, or two or more units may be integrated into one unit. The integrated unit may be implemented in a form of a software function unit.

When the integrated unit is implemented in the form of a software functional unit and sold or used as an independent product, the integrated unit may be stored in a computer-readable storage medium. Based on such an understanding, all or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of the present disclosure. The storage medium is a non-transitory medium, and includes any medium that can store program code, such as a flash memory, a removable hard disk, a read-only memory, a random access memory, a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. An air interface (AI) technology configuration method, comprising:
   determining, by a wireless access device, at least two AI technologies to be configured on a same carrier;
   determining, by the wireless access device, configuration information of the at least two AI technologies;
   sending, by the wireless access device to a mobile device, the configuration information of the at least two AI technologies to configure the at least two AI technologies on the same carrier for the mobile device;
   in a first transmission time interval (TTI), activating, by the wireless access device in a first frequency range, measurement information corresponding to a first AI technology in the at least two AI technologies; and
   deactivating, by the wireless access device in a second frequency range, the measurement information corresponding to the first AI technology.

2. The configuration method according to claim 1, wherein the configuration information of the at least two AI technologies comprises the first frequency range and a common frequency range,
   wherein the first frequency range comprises a first frequency subrange that corresponds to the at least two AI technologies and that is pre-configured by the wireless access device, the first frequency subrange is used to transmit control information corresponding to the at least two AI technologies, and
   wherein the common frequency range is used by the wireless access device to allocate, based on a resource requirement of the mobile device, resources corresponding to the at least two AI technologies.

3. The configuration method according to claim 2, wherein the configuration information of the at least two AI technologies further comprises the second frequency range,
   wherein the second frequency range comprises a second frequency subrange that corresponds to each of the at least two AI technologies and that is pre-configured by the wireless access device, and the second frequency subrange is used by the wireless access device to allocate, based on the resource requirement of the mobile device, a resource corresponding to the at least two AI technologies.

4. The configuration method according to claim 1, wherein the configuration information of the at least two AI technologies comprises common Media Access Control (MAC) information and particular MAC information,
   wherein the common MAC information corresponds to at least one MAC function unit or the common MAC information corresponds to the at least two AI technologies, and
   wherein the particular MAC information corresponds to the at least two AI technologies.

5. The configuration method according to claim 1, wherein after the sending, by the wireless access device, the configuration information of the at least two AI technologies to the mobile device, the configuration method further comprises:
   allocating, by the wireless access device for the mobile device, resources corresponding to the at least two AI technologies on the same carrier;
   determining, by the wireless access device, a resource location of resource allocation information for each AI technology of the at least two AI technologies based on a preset subcarrier spacing and a transmission time interval (TTI) length corresponding to the AI technology, wherein the resource allocation information is used to indicate a resource corresponding to the AI technology; and
   sending, by the wireless access device, the resource allocation information to the mobile device based on the resource location.

6. The configuration method according to claim 1, wherein after the sending, by the wireless access device, the configuration information of the at least two AI technologies to the mobile device, the configuration method further comprises:
   allocating, by the wireless access device for the mobile device, resources corresponding to the at least two AI technologies on the same carrier;
   determining, by the wireless access device, a resource location of resource allocation information for each AI technology of the at least two AI technologies based on a subcarrier spacing for the AI technology and a corresponding transmission time interval (TTI) length for the AI technology, wherein the resource allocation information is used to indicate a resource corresponding to the AI technology; and
   sending, by the wireless access device, the resource allocation information to the mobile device based on the resource location.

7. The configuration method according to claim 1, wherein after the sending, by the wireless access device, the configuration information of the at least two AI technologies to the mobile device, the configuration method further comprises:
   allocating, by the wireless access device for the mobile device, resources corresponding to the at least two AI technologies on the same carrier;
   determining, by the wireless access device, for each AI technology of the at least two AI technologies, a resource location in a first frequency subrange of resource allocation information based on a subcarrier spacing for the AI technology and a transmission time interval (TTI) length for the AI technology, wherein the resource allocation information is used to indicate a resource corresponding to the AI technology; and sending, by the wireless access device, the resource allocation information to the mobile device based on the resource location.

8. The configuration method according to claim 1, wherein the configuration method further comprises:
sending, by the wireless access device to the mobile device, the measurement information, wherein the measurement information is used to instruct the mobile device to perform measurement;
wherein the measurement information comprises:
a measurement object, and the measurement object is the first frequency range; or
a measurement object and a measurement sub-object, the measurement object is a carrier corresponding to the first AI technology, and the measurement sub-object is the first frequency range corresponding to the first AI technology.

9. The configuration method according to claim 8, wherein the measurement information further comprises at least one piece of subframe configuration information, the at least one piece of subframe configuration information is used to instruct the mobile device to perform measurement on a subframe indicated by the at least one piece of subframe configuration information.

10. The configuration method according to claim 1, wherein the configuration method further comprises:
configuring, by the wireless access device, a same physical uplink control channel (PUCCH) for each of the at least two AI technologies; or
configuring, by the wireless access device, a different PUCCH for each of the at least two AI technologies; or
configuring, by the wireless access device, different PUCCHs for some of the at least two AI technologies, and configuring, by the wireless access device for other AI technologies than the some of the at least two AI technologies, a PUCCH the same as that for at least one of the some AI technologies.

11. The configuration method according to claim 1, wherein the configuration method further comprises:
configuring, by the wireless access device, different physical downlink control channels (PDCCHs) and enhanced physical downlink control channels (EPDCCHs) for at least one of the at least two AI technologies; and
configuring, by the wireless access device for other AI technologies than the at least one of the at least two AI technologies, a PDCCH and an EPDCCH that are the same as the PDCCH and EPDCCH configured for the at least one of the AI technologies, wherein the other AI technologies and the at least one AI technology correspond to different carriers.

12. An air interface (AI) technology configuration method, comprising:
receiving, by a mobile device from a wireless access device, configuration information that is of at least two AI technologies on a same carrier; and
configuring, by the mobile device, the at least two AI technologies on the same carrier based on the configuration information; and
in a first transmission time interval (TTI), activating, by the mobile device in a first frequency range, measurement information corresponding to a first AI technology in the at least two AI technologies, and deactivating, by the mobile device in a second frequency range, the measurement information corresponding to the first AI technology.

13. The configuration method according to claim 12, wherein after the configuring, by the mobile device, the at least two AI technologies on the same carrier, the configuration method further comprises:
determining, by the mobile device, a resource location of resource allocation information for each AI technology of the at least two AI technologies based on a preset subcarrier spacing and a transmission time interval (TTI) length corresponding to the AI technology, wherein the resource allocation information is used to indicate a resource corresponding to the AI technology; and
receiving, by the mobile device based on the resource location, the resource allocation information sent by the wireless access device.

14. The configuration method according to claim 12, wherein after the configuring, by the mobile device, the at least two AI technologies on the same carrier, the configuration method further comprises:
determining, by the mobile device, a resource location of resource allocation information for each AI technology of the at least two AI technologies based on a subcarrier spacing for the AI technology and a transmission time interval (TTI) length for the AI technology, wherein the resource allocation information is used to indicate a resource corresponding to the AI technology; and
receiving, by the mobile device based on the resource location, the resource allocation information sent by the wireless access device.

15. The configuration method according to claim 12, wherein after the configuring, by the mobile device, the at least two AI technologies on the same carrier, the configuration method further comprises:
determining, by the mobile device, for each AI technology of the at least two AI technologies, a resource location in the first frequency range of resource allocation information based on a subcarrier spacing for the AI technology and a transmission time interval (TTI) length for the AI technology, wherein the resource allocation information is used to indicate a resource corresponding to the AI technology; and
receiving, by the mobile device based on the resource location, the resource allocation information sent by the wireless access device.

16. A wireless access device, comprising:
a processor, configured to determine at least two AI technologies to be configured on a same carrier and configuration information of the at least two AI technologies; and
a transceiver, configured to send the configuration information that is of the at least two AI technologies to a mobile device to configure the at least two AI technologies on the same carrier for the mobile device;
wherein the processor is further configured to, in a first transmission time interval (TTI), activate, in a first frequency range, measurement information corresponding to a first AI technology in the at least two AI technologies, and deactivate, in a second frequency range, the measurement information corresponding to the first AI technology.

17. The wireless access device according to claim 16, wherein the configuration information of the at least two AI technologies comprises the first frequency range and a common frequency range, wherein the first frequency range comprises a first frequency subrange that corresponds to the at least two AI technologies and that is pre-configured by the wireless access device, the first frequency subrange is used to transmit control information corresponding to the at least two AI technologies, and wherein the common frequency range is used by the wireless access device to allocate, based on a resource requirement of the mobile device, resources corresponding to the at least two AI technologies.

18. The wireless access device according to claim 17, wherein the configuration information of the at least two AI technologies further comprises the second frequency range, wherein the second frequency range comprises a second frequency subrange that corresponds to each of the at least two AI technologies and that is pre-configured by the wireless access device, and the second frequency subrange is used by the wireless access device to allocate, based on the resource requirement of the mobile device, a resource corresponding to the at least two AI technologies.

19. The wireless access device according to claim 16, wherein the configuration information of the at least two AI technologies comprises common Media Access Control (MAC) information and particular MAC information, wherein the common MAC information corresponds to the at least one MAC function unit or the common MAC information corresponds to at least two AI technologies, and wherein the at least one MAC information corresponds to the at least two AI technologies.

20. The wireless access device according to claim 16, wherein:

the processor is configured to allocate, for the mobile device after the transceiver sends the configuration information of the at least two AI technologies to the mobile device, resources corresponding to the at least two AI technologies on the same carrier;

the processor is further configured to determine a resource location of resource allocation information for each AI technology of the at least two AI technologies based on a preset subcarrier spacing and a transmission time interval (TTI) length corresponding to the AI technology, wherein the resource allocation information is used to indicate a resource that corresponds to the AI technology and that is allocated by the processor; and the transceiver is further configured to send the resource allocation information to the mobile device based on the resource location determined by the processor.

21. The wireless access device according to claim 16, wherein:

the processor is configured to allocate, for the mobile device after the transceiver sends the configuration information of the at least two AI technologies to the mobile device, resources corresponding to the at least two AI technologies on the same carrier;

the processor is further configured to determine a resource location of resource allocation information for each AI technology of the at least two AI technologies based on a subcarrier spacing for the AI technology and a transmission time interval (TTI) length for the AI technology, wherein the resource allocation information is used to indicate a resource that corresponds to the AI technology and that is allocated by the processor; and the transceiver is further configured to send the resource allocation information to the mobile device based on the resource location determined by the processor.

22. The wireless access device according to claim 16, wherein:

the processor is configured to allocate, for the mobile device after the transceiver sends the configuration information of the at least two AI technologies to the mobile device, resources corresponding to the at least two AI technologies on the same carrier;

the processor is further configured to determine, for each AI technology of the at least two AI technologies, a resource location in a first frequency subrange of resource allocation information based on a subcarrier spacing for the AI technology and a transmission time interval (TTI) length for the AI technology, wherein the resource allocation information is used to indicate a resource that corresponds to the AI technology and that is allocated by the processor; and the transceiver is further configured to send the resource allocation information to the mobile device based on the resource location determined by the processor.

23. The wireless access device according to claim 16, wherein the transceiver is further configured to send, to the mobile device, the measurement information, wherein the measurement information is used to instruct the mobile device to perform measurement;

wherein the measurement information comprises:

a measurement object, and the measurement object is the first frequency range corresponding to the first AI technology; or a measurement object and a measurement sub-object, the measurement object is a carrier corresponding to the first AI technology, and the measurement sub-object is the first frequency range corresponding to the first AI technology.

24. The wireless access device according to claim 23, wherein the measurement information further comprises at least one piece of subframe configuration information, the at least one piece of subframe configuration information is used to instruct the mobile device to perform measurement on a subframe indicated by the at least one piece of subframe configuration information.

25. A mobile device, comprising:

a transceiver, configured to receive from a wireless access device configuration information that is of at least two air interface (AI) technologies on a same carrier; and a processor, configured to:

configure the at least two AI technologies on the same carrier based on the configuration information, in a first transmission time interval (TTI), activate, in a first frequency range, measurement information corresponding to a first AI technology in the at least two AI technologies, and deactivate, in a second frequency range, the measurement information corresponding to the first AI technology.

26. The mobile device according to claim 25, wherein:

the processor is configured to, after the processor configures the at least two AI technologies on the same carrier based on the configuration information, determine a resource location of resource allocation information for each AI technology of the at least two AI technologies based on a preset subcarrier spacing and a transmission time interval (TTI) length corresponding to the AI technology, wherein the resource allocation information is used to indicate a resource corresponding to the AI technology; and the transceiver is further configured to receive, based on the resource location determined by the processor, the resource allocation information sent by the wireless access device.

27. The mobile device according to claim 25, wherein:

the processor is configured to, after the processor configures the at least two AI technologies on the same carrier based on the configuration information, determine a resource location of resource allocation information for each AI technology of the at least two AI technologies based on a subcarrier spacing for the AI technology and a transmission time interval (TTI) length for the AI technology, wherein the resource allocation information is used to indicate a resource corresponding to the AI technology; and the transceiver is further configured to receive, based on the resource location determined by the processor, the resource allocation information sent by the wireless access device.

28. The mobile device according to claim 25, wherein:

the processor is configured to, after the processor configures the at least two AI technologies on the same carrier based on the configuration information, determine, for each AI technology of the at least two AI technologies, a resource location in the first frequency range of resource allocation information based on a subcarrier spacing for the AI technology and a transmission time interval (TTI) length for the AI technology, wherein the resource allocation information is used to indicate a resource corresponding to the AI technology; and the transceiver is further configured to receive, based on the resource location determined by the processor, the resource allocation information sent by the wireless access device.

* * * * *